United States Patent
Matsuzawa et al.

(10) Patent No.: US 11,307,809 B2
(45) Date of Patent: Apr. 19, 2022

(54) INFORMATION PROCESSING DEVICE, LEARNING DEVICE, AND STORAGE MEDIUM STORING LEARNT MODEL

(71) Applicant: SEIKO EPSON CORPORATION, Tokyo (JP)

(72) Inventors: Tomoki Matsuzawa, Shiojiri (JP); Shuichi Shima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/810,295

(22) Filed: Mar. 5, 2020

(65) Prior Publication Data

US 2020/0285426 A1  Sep. 10, 2020

(30) Foreign Application Priority Data

Mar. 8, 2019 (JP) .............................. JP2019-042317

(51) Int. Cl.
| | |
|---|---|
| *G06F 3/12* | (2006.01) |
| *G06F 9/451* | (2018.01) |
| *G06N 20/00* | (2019.01) |
| *G06N 3/08* | (2006.01) |
| *G06N 5/04* | (2006.01) |

(52) U.S. Cl.
CPC .......... *G06F 3/1204* (2013.01); *G06F 3/1292* (2013.01); *G06F 9/453* (2018.02); *G06N 3/084* (2013.01); *G06N 5/046* (2013.01); *G06N 20/00* (2019.01)

(58) Field of Classification Search
CPC ...... G06F 3/1204; G06F 9/453; G06F 3/1292; G06F 3/1253; G06N 20/00; G06N 3/084; G06N 5/046; G06N 3/0454; G06N 3/0445
See application file for complete search history.

(56) References Cited

U.S. PATENT DOCUMENTS

| 2010/0238502 A1* | 9/2010 | Oshima ................. G06F 3/1236 358/1.15 |
| 2014/0009776 A1* | 1/2014 | Suzuki ............... H04N 1/00108 358/1.13 |
| 2015/0363140 A1* | 12/2015 | Koutrika ............ G06Q 30/0255 358/1.15 |

(Continued)

FOREIGN PATENT DOCUMENTS

| JP | 2006-315247 | 11/2006 |
| JP | 2016-028528 | 2/2016 |

(Continued)

OTHER PUBLICATIONS

Machine translation for JP2018-069684. (Year: 2018).*

*Primary Examiner* — Iriana Cruz
(74) *Attorney, Agent, or Firm* — Workman Nydegger

(57) ABSTRACT

The information processing apparatus includes a reception section, a processor, and a storage section. The storage section stores a learnt model obtained by mechanically learning the relationship between image information and operation information based on a data set in which the image information and the operation information indicating a user operation are associated with each other. The reception section receives image information as an input. The processor performs a process of displaying a recommended operation associated with the image information received as an input based on a learnt model.

14 Claims, 20 Drawing Sheets

(56) References Cited

U.S. PATENT DOCUMENTS

2016/0098606 A1* 4/2016 Nakamura ......... G06K 9/00805
                                                                 382/103
2017/0163826 A1 6/2017 Nakazawa et al.
2020/0319830 A1* 10/2020 Kaneda ................ G06F 3/1288

FOREIGN PATENT DOCUMENTS

| JP | 2017-107528 | | 6/2017 | |
|----|-------------|---|--------|----------|
| JP | 2018-069684 | | 5/2018 | |
| JP | 2018069684 | * | 5/2018 | ............. H04N 1/00 |
| JP | 2018-099817 | | 6/2018 | |
| JP | 2020-030594 | | 2/2020 | |

* cited by examiner

| PRINT SETTING | | |
|---|---|---|
| BASIC SETTING | PAGE SETTING | UTILITY |

FAVORITE (V)  [ CURRENT SETTING ▷ ]   [ REGISTER CURRENT SETTING (F)... ]

PRINT SETTING
- SHEET TYPE (T) [ PLAIN PAPER ▷ ]
- PRINT QUALITY (Q) [ STANDARD ▷ ]
- COLOR (C) [ COLOR ▷ ]
  - GRAYSCALE
- SHEET FEEDING SETTING
- SHEET FEEDING METHOD (R) [ SHEE ]
- SHEET SIZE (Z) [ A4 210×297 mm ]

☐ FRAME-LESS (B)    [ PROTRUSION AMOUNT SETTING (O)... ]

AMOUNT OF REMAINING INK

C   Y   LC   BK   M   LM

[ RETURN TO INITIAL SETTING (L) ]

[ OK ]  [ CANCEL ]  [ APPLY (A) ]  [ HELP ]

FIG. 9

| PRINT SETTING | | | |
|---|---|---|---|
| BASIC SETTING | PAGE SETTING | UTILITY | |

FAVORITE (V): [CURRENT SETTING ▷] [REGISTER CURRENT SETTING (F)...]

PRINT SETTING
- SHEET TYPE (T): [PLAIN PAPER ▷]
- PRINT QUALITY (Q): [STANDARD ▷]
- COLOR (C): [COLOR ▷]

SHEET FEEDING SETTING
SHEET FEEDING METHOD (R): [SHEET-FEEDING AUTOMATIC SELECTION ▷]
SHEET SIZE (Z):
```
A4  210×297 mm
A4  210×297 mm
B5  182×257 mm
A5  148×210 mm
A6  105×148 mm
POSTCARD 100×148 mm
```

C   Y   LC   BK   M   LM

[RETURN TO INITIAL SETTING (L)]

[OK] [CANCEL] [APPLY (A)] [HELP]

INFORMATION PROCESSING DEVICE, LEARNING DEVICE, AND STORAGE MEDIUM STORING LEARNT MODEL

The present application is based on, and claims priority from JP Application Serial Number 2019-042317, filed Mar. 8, 2019, the disclosure of which is hereby incorporated by reference herein in its entirety.

BACKGROUND

1. Technical Field

The present disclosure relates to an information processing device, a learning device, and a storage medium storing a learnt model.

2. Related Art

In general, various methods for reducing a burden of a user when an operation is performed on an electronic apparatus have been used. For example, JP-A-2018-99817 discloses a method for generating an estimation model by machine learning and a method for estimating a function to be used by a user based on the estimation model and a user action.

When a user operation associated with image information is performed, an operation desired by the user may vary depending on the image information. Image information is not taken into consideration in the general method disclosed in JP-A-2018-99817, and therefore, it is difficult to appropriately estimate an operation recommended for the user.

SUMMARY

According to an aspect or the present disclosure, an information processing device includes a storage section configured to store a learnt model obtained by mechanically learning the relationship between image information and operation information indicating a user operation based on a data set in which the image information and the operation information are associated with each other, a reception section configured to receive the image information as an input, and a processor configured to determine recommended operation information indicating a recommended operation associated with the image information received as an input based on the learnt model.

BRIEF DESCRIPTION OF THE DRAWINGS

FIG. 5 is a diagram illustrating an example of an operation screen associated with a sheet type.

FIG. 7 is a diagram illustrating an example of an operation screen associated with a color setting.

FIG. 9 is a diagram illustrating an example of an operation screen associated with a sheet size.

DESCRIPTION OF EXEMPLARY EMBODIMENTS

Hereinafter, an embodiment of the present disclosure will be described with reference to the accompanying drawings. Note that the embodiment described below does not restrict content disclosed in claims. Furthermore, it is not necessarily the case that all components described in this embodiment are requirements.

1. Outline

Figure 1:
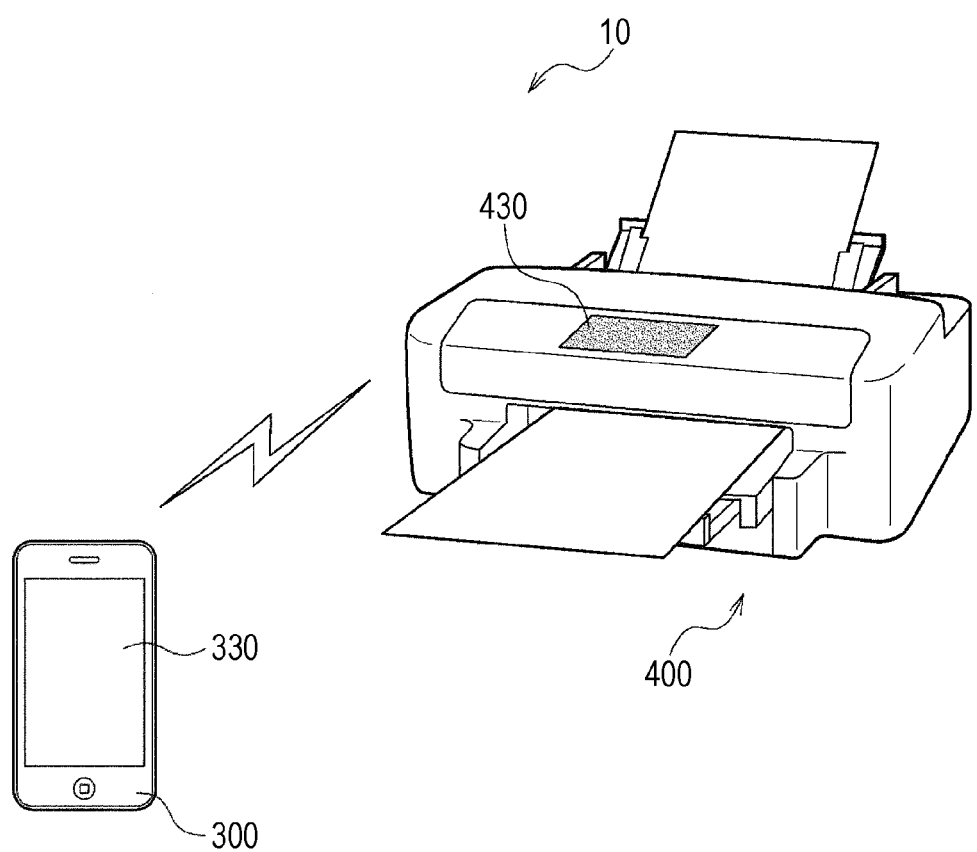
FIG. 1 is a diagram illustrating an example of a configuration of a system including an electronic apparatus.

FIG. 1 is a diagram schematically illustrating an example of a system 10 including a terminal device 300 and an electronic apparatus 400. The terminal device 300 may be a mobile terminal device, such as a smartphone or a tablet terminal, or a device, such as a personal computer (PC). The electronic apparatus 400 is a printer, for example. Alternatively, the electronic apparatus 400 may be a scanner, a facsimile device, or a photocopier. The electronic apparatus 400 may be a multifunction peripheral (MFP) having a plurality of functions, and an MFP having a print function is also an example of a printer.

Figure 2:
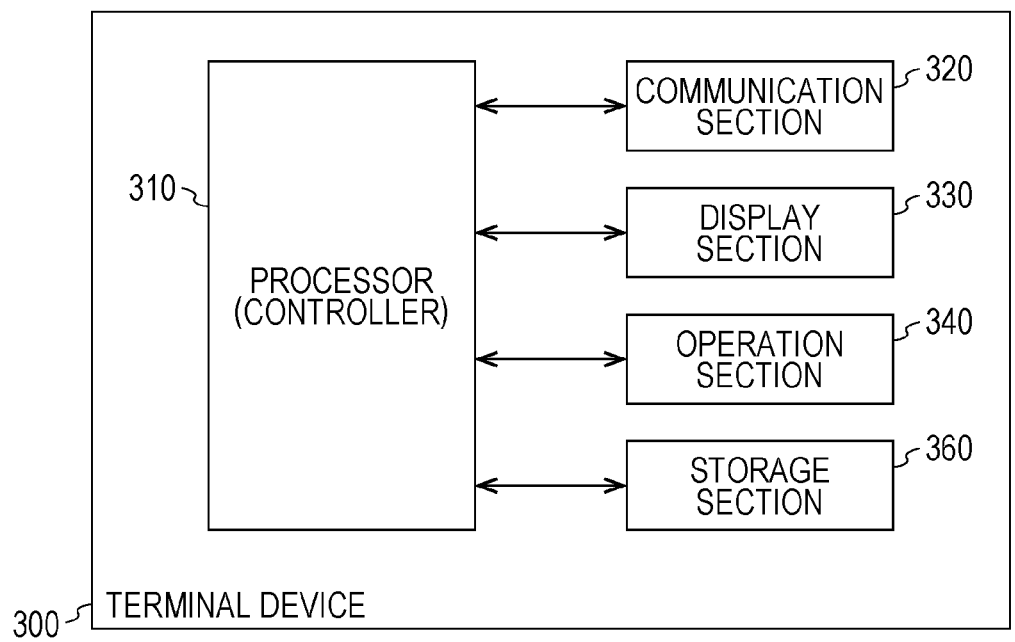
FIG. 2 is a diagram illustrating an example of a configuration of a terminal device.

FIG. 2 is a block diagram illustrating an example of a configuration of the terminal device 300. The terminal device 300 includes a processor 310, a communication section 320, a display section 330, an operation section 340, and a storage section 360.

The processor 310 controls the communication section 320, the display section 330, the operation section 340, and the storage section 360. The processor 310 is a central processing unit (CPU), for example. The communication section 320 is a communication interface, such as a wireless communication chip, and performs communication with other apparatuses including the electronic apparatus 400. The display section 330 is a display or the like which displays various information for a user, and the operation section 340 is a button which receives an input operation performed by the user. Note that the display section 330 and the operation section 340 may be integrally configured as a touch panel, for example.

The storage section 360 stores various information, such as data and programs. The processor 310 and the communication section 320 operate using the storage section 360 as a work area, for example. The storage section 360 may be a semiconductor memory, such as a static random access memory (SRAM) or a dynamic random access memory (DRAM), a magnetic storage device, such as a hard disk drive (HDD), or an optical storage device, such as an optical disc device.

Figure 3:
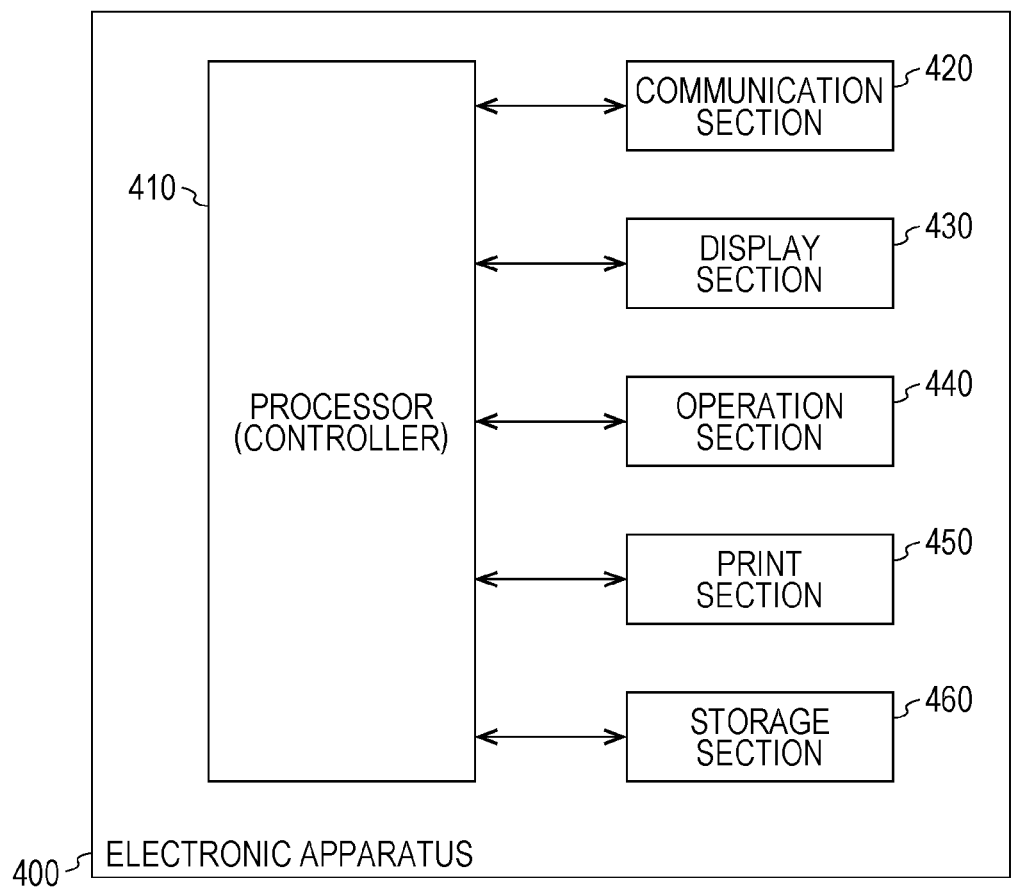
FIG. 3 is a diagram illustrating an example of a configuration of the electronic apparatus.

FIG. 3 is a block diagram illustrating an example of a configuration of the electronic apparatus 400. Note that the electronic apparatus 400 illustrated in FIG. 3 has a print function and is a printer, for example, hereinafter. The electronic apparatus 400 includes a processor 410, a communication section 420, a display section 430, an operation section 440, a print section 450, and a storage section 460.

The processor 410 controls the communication section 420, the display section 430, the operation section 440, the print section 450, and the storage section 460. The processor 410 may include a plurality of CPUs including a main CPU and a sub CPU or a micro-processing unit (MPU). The main CPU controls the sections included in the electronic apparatus 400 and the entire electronic apparatus 400. The sub CPU performs various processes associated with printing when the electronic apparatus 400 is a printer, for example.

The communication section 420 is a communication interface, such as a wireless communication chip and performs communication with other apparatuses including the terminal device 300. The display section 430 is constituted by a display which displays various information for the user, and the operation section 440 is constituted by a button or the like which receives an input operation performed by the user. Note that the display section 430 and the operation section 440 may be integrally configured as a touch panel, for example.

The print section 450 includes a print engine. The print engine is a mechanical configuration which executes printing of an image on a print medium. The print engine includes, for example, a transport mechanism, an ink jet ejection head, and a mechanism for driving a carriage accommodating the ejection head. The print engine prints an image on a print medium by causing the ejection head to eject ink to the print medium transported by the transport mechanism. Although an example in which the print medium is a sheet is illustrated hereinafter, other print media, such as fabric, may be used. Note that a concrete configuration of the print engine is not limited to those illustrated herein, and printing is performed using toner by an electrophotographic method.

The storage section 460 stores various information including data and programs. The processor 410 and the communication section 420 operate using the storage section 460 as a work area, for example. The storage section 460 may be a semiconductor memory, a register, a magnetic storage device, or an optical storage device.

In general, a method for causing the print section 450 of the electronic apparatus 400 to perform printing by receiving a user operation using the terminal device 300 has been widely employed. The operation will be described in detail with reference to FIGS. 4 to 10.

Figure 4:
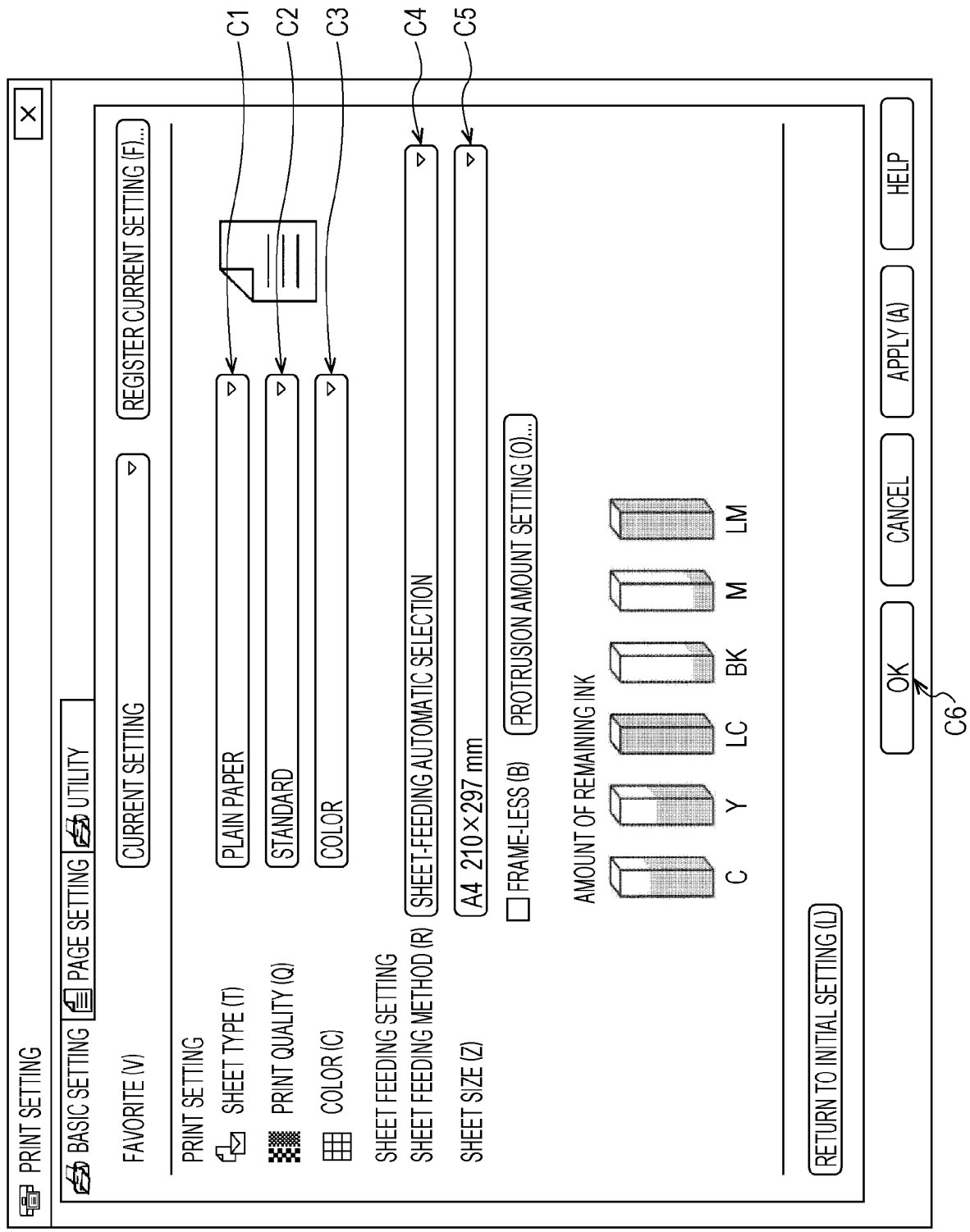
FIG. 4 is a diagram illustrating an example of an operation screen displayed in a display section of the terminal device.

FIG. 4 is a diagram illustrating an example of a screen displayed in the display section 330 of the terminal device 300 which is a PC, for example. A print setting screen is displayed as illustrated in FIG. 4 when print of given image information is instructed using an application operating in the PC, for example. The image information is not limited to a specific type of image and various data may be used including documents, photographs, and maps.

In the print setting screen of FIG. 4, the user performs an operation of determining setting values of various setting items. The setting items specifically correspond to a sheet type, print quality, a color setting, a sheet feeding method, and a sheet size. In the example of FIG. 4, "plain paper", "standard", "color", "sheet-feeding automatic selection", and "A4" have been set as initial values of the setting values. When a print execution operation is performed in the state of FIG. 4, the terminal device 300 instructs the electronic apparatus 400 to perform color printing on plain paper with standard print quality. Furthermore, the terminal device 300 instructs the electronic apparatus 400 to perform printing in the A4 size using a print medium mounted on a sheet feeding tray which has been automatically selected. Note that the print execution operation may correspond to an operation of pressing an OK button indicated by C6 in FIG. 4 or an operation of pressing a print button, not illustrated, in addition to pressing of the OK button.

Figure 5:
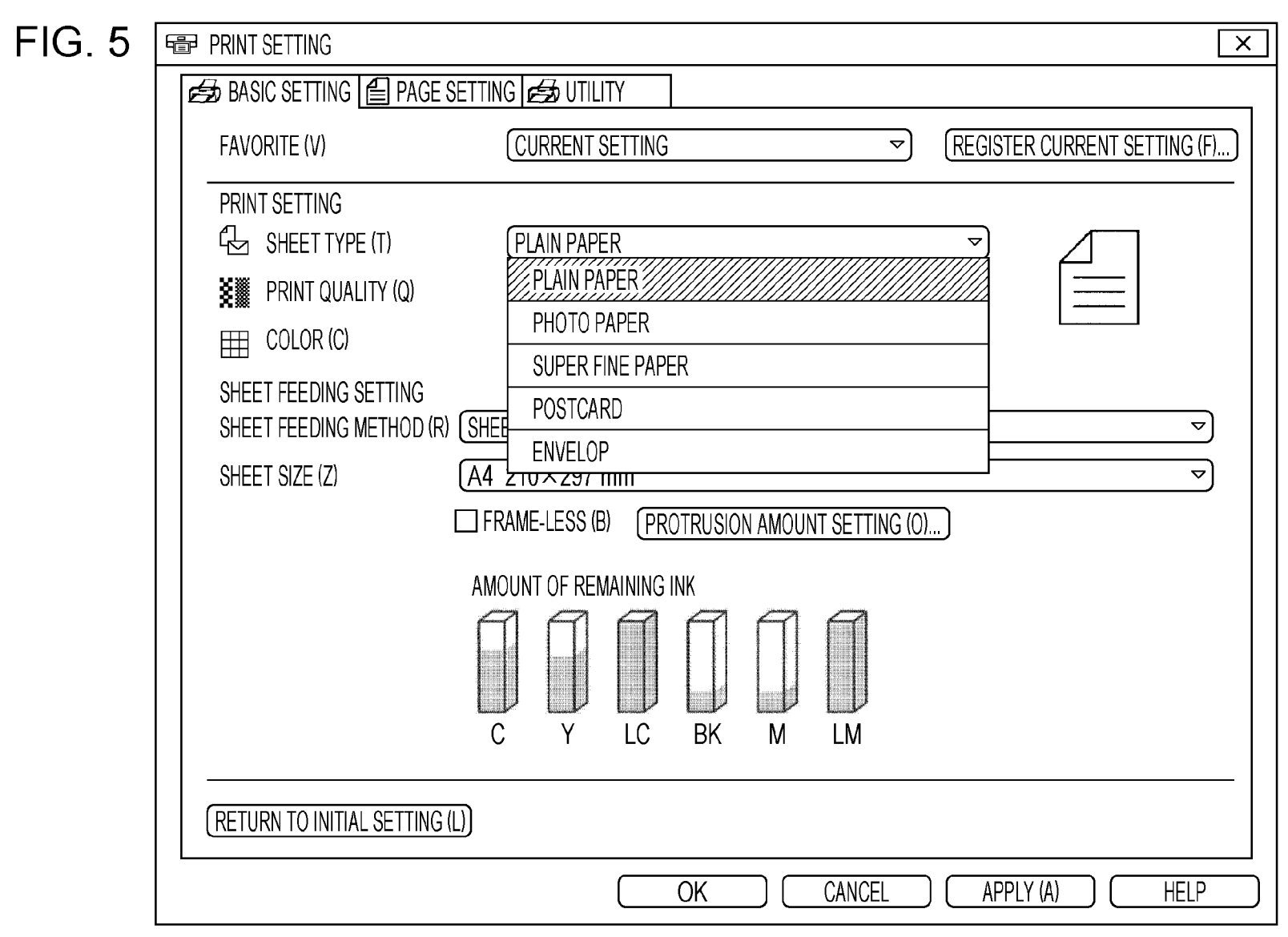

FIG. 5 is a diagram illustrating an example of a display screen displayed when an operation of selecting a sheet type as a setting item is performed. The operation of selecting a sheet type is performed on a region indicated by C1 in FIG. 4, for example. In this case, five candidates of the setting value, that is, "plain paper", "photo paper", "super fine paper", "postcard", and "envelope", are displayed.

Figure 6:
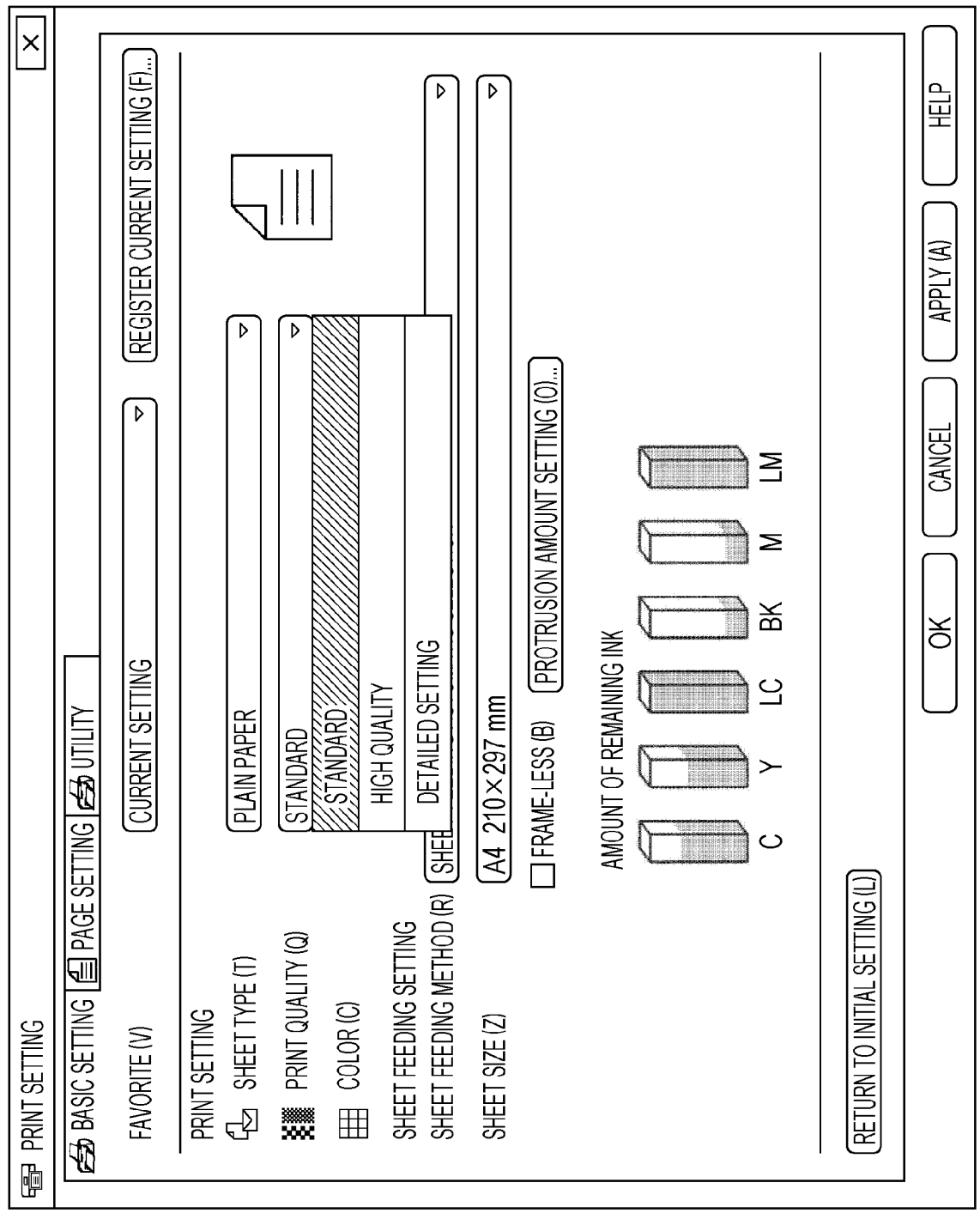
FIG. 6 is a diagram illustrating an example of an operation screen associated with print quality.

FIG. 6 is a diagram illustrating an example of a display screen displayed when an operation of selecting print quality as a setting item is performed. The operation of selecting print quality is performed on a region indicated by C2 in FIG. 4. In this case, three candidates of the setting value, that is, "standard", "high quality", and "detailed setting", are displayed. The print quality is set as the setting item to determine a print speed, for example.

FIG. 7 is a diagram illustrating an example of a display screen displayed when an operation of selecting a color setting as a setting item is performed. The operation of selecting a color setting is performed on a region indicated by C3 in FIG. 4, for example. In this case, two candidates of the setting value, that is, "color", and "grayscale", are displayed.

Figure 8:
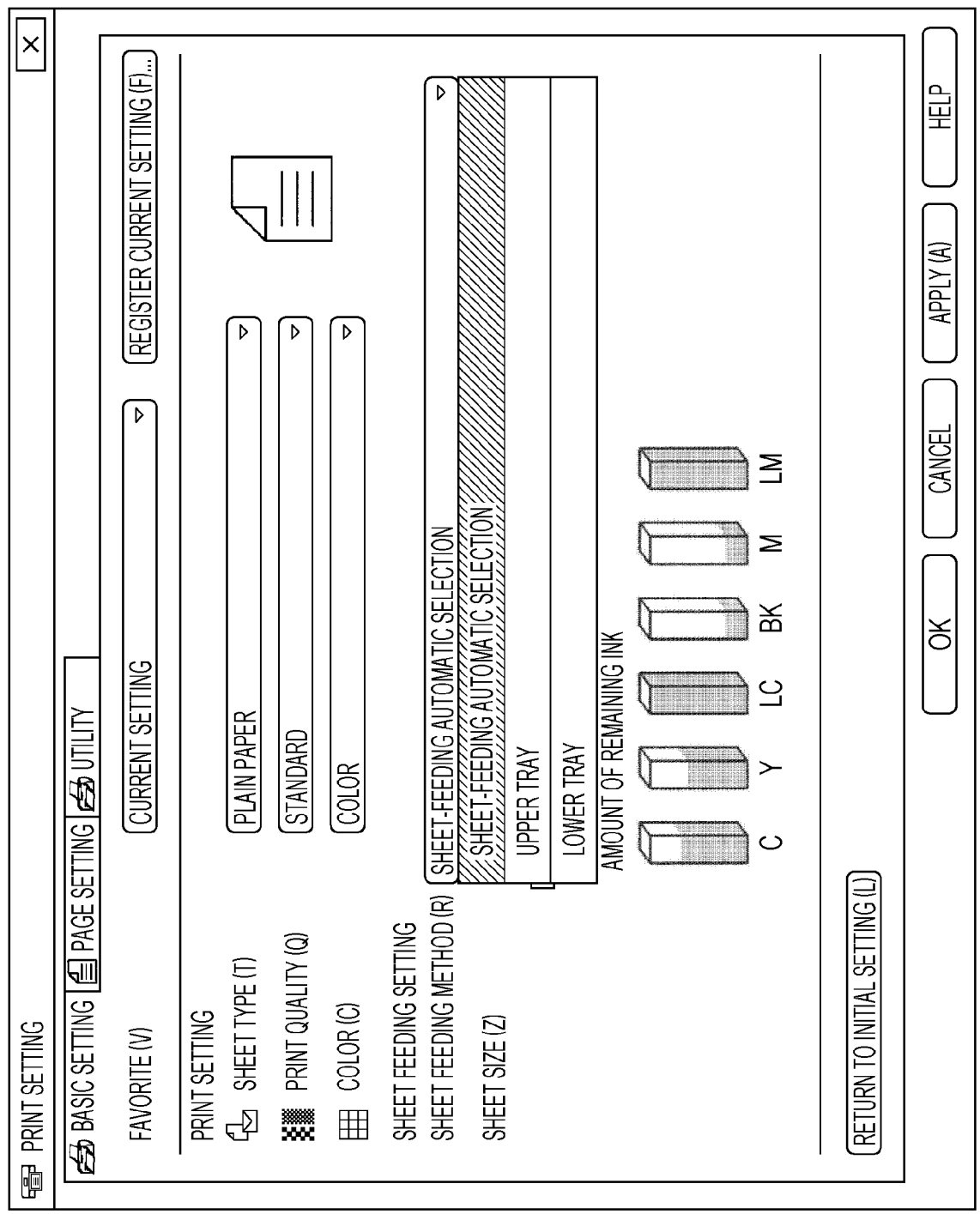
FIG. 8 is a diagram illustrating an example of an operation screen associated with a sheet feeding method.

FIG. 8 is a diagram illustrating an example of a display screen displayed when an operation of selecting a sheet feeding method as a setting item is performed. The operation of selecting a sheet feeding method is performed on a region indicated by C4 in FIG. 4, for example. In this case, three candidates of the setting value, that is, "sheet-feeding automatic selection", "upper tray", and "lower tray" are displayed. The sheet feeding method is set as a setting item to determine a sheet feeding tray which is a supply source of print media in the electronic apparatus 400. The sheet feeding tray may be paraphrased as a sheet feeding cassette. Since it is assumed that the electronic apparatus 400 has a plurality of sheet feeding trays, the setting value may specify one of the different trays, that is, an "upper tray" and a "lower tray".

FIG. 9 is a diagram illustrating an example of a display screen displayed when an operation of selecting a sheet size as a setting item is performed. The operation of selecting a sheet size is performed on a region indicated by C5 in FIG.

4, for example. In this case, five candidates of the setting value, that is, "A4", "B5", "A5", "A6", and "postcard", are displayed.

Figure 10:
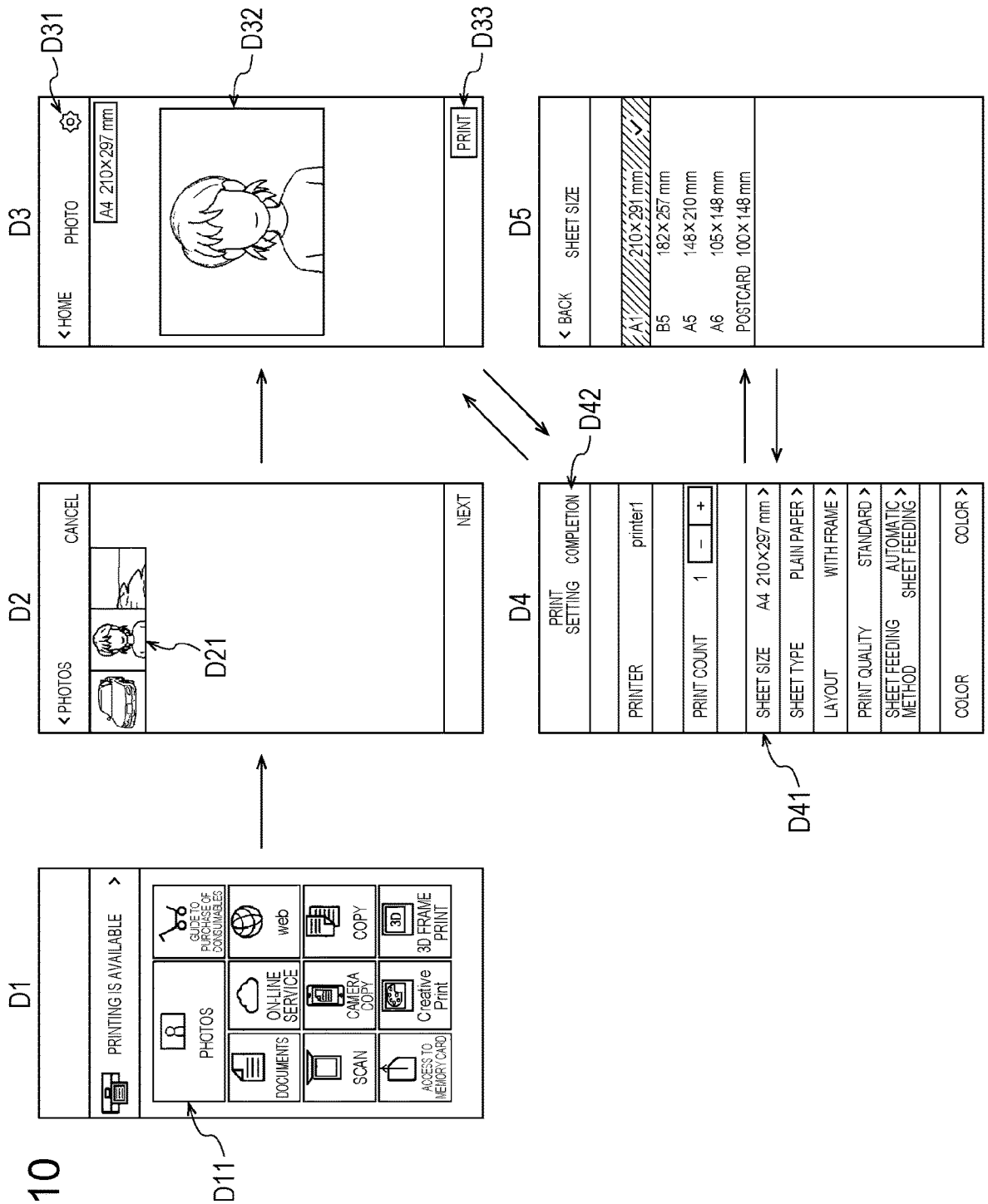
FIG. 10 is a diagram illustrating an example of transition of the operation screen displayed in the display section of the terminal device.

FIG. 10 is a diagram illustrating an example of transition of a screen displayed in the display section 330 of the terminal device 300 which is a mobile terminal device, such as a smartphone, for example. In FIG. 10, D1 indicates an example of a home screen of print application software, for example. When a photograph button denoted by D11 is operated in the home screen, an image selection screen denoted by D2 is displayed as the display screen. When an operation of selecting one of images is performed in the image selection screen, a preview screen denoted by D3 is entered as the display screen. An image denoted by D21, for example, is selected in this embodiment, and the selected image is displayed in a region denoted by D32.

When a setting button denoted by D31 is operated in the preview screen, a print setting screen denoted by D4 is entered as the display screen. The print setting screen displays information for specifying a selected printer as a printer to execute printing, setting items of the printer, and current setting values. The setting items have been illustrated in FIGS. 4 to 9.

When an operation of selecting a specific one of the setting items is performed in the print setting screen, a setting value selection screen is entered as the display screen. When an operation of selecting a sheet size denoted by D41 is performed, for example, a sheet size selection screen denoted by D5 is entered as the display screen. When one of the setting values is selected in the sheet size selection screen, a setting value of the sheet size is changed to the selected value. Thereafter, the print setting screen denoted by D4 is entered again as the display screen.

When desired setting values are selected in the setting items, the user presses a completion button denoted by D42 in the print setting screen. When the completion button is operated, the preview screen denoted by D3 is entered as the display screen. When a print execution operation is performed in the preview screen, the terminal device 300 instructs the electronic apparatus 400 to perform printing using the current setting values. The print execution operation is performed on a print button denoted by D33.

As illustrated in FIGS. 4 to 10, the various setting values associated with printing are provided and a plurality of setting values are expected for each of the setting items. Types of setting item and selectable setting values for the individual setting items vary depending on a concrete configuration of the electronic apparatus 400. For example, in a printer dedicated for monochrome printing, a setting value for the setting item of the color setting is fixed to "grayscale". Furthermore, printing on large sized sheets such as an A2 size and an A3 size is available in large sized printers, and therefore, the large sized sheets are selectable as the setting value of the sheet size.

In general, when the user intends to perform desired printing, an operation of selecting a setting item having a setting value to be changed, an operation of selecting an appropriate value from among a plurality of setting values of the setting item, and the like are required to be performed on each of the setting items. Furthermore, this operation is required to be performed every time print data is selected, and accordingly, a burden of the user is large.

Furthermore, the example in which the operation associated with printing of image information is performed in the terminal device 300 which is different from the electronic apparatus 400 is described hereinabove. However, a problem of the large burden of the user who performs the print operation similarly arises even when the electronic apparatus 400 which is a print device receives a user operation.

Figure 11:
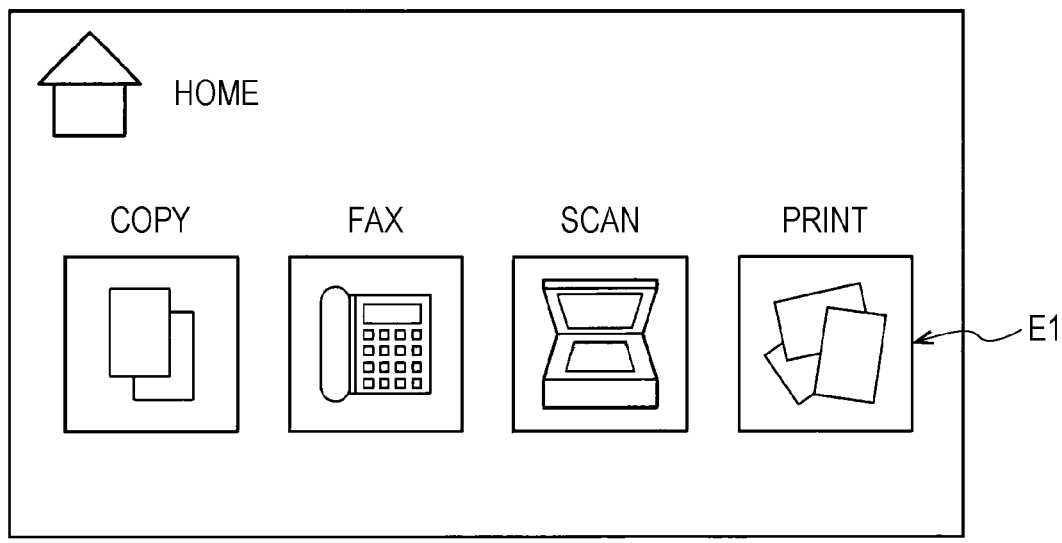
FIG. 11 is a diagram illustrating an example of an operation screen displayed in a display section of the electronic apparatus.

FIG. 11 is a diagram illustrating an example of a screen displayed in the display section 430 of the terminal device 400. When a print button denoted by E1 in FIG. 11 is operated, as with D2 of FIG. 10, for example, a screen for selecting an image to be printed is entered. Data to be selected may be data stored in the storage section 460 of the electronic apparatus 400 or data stored in another device which may be communicated with the electronic apparatus 400 through the communication section 420. Screen transition which occurs thereafter is the same as the example illustrated in FIG. 10, and therefore, a detailed description thereof is omitted.

JP-A-2018-99817 discloses a method for generating an estimation model by machine learning and a method for estimating a function to be used by a user based on the estimation model and a user action. However, image information is not taken into consideration in JP-A-2018-99817. In apparatuses which process image information, such as a printer, tendency of a preferable operation may vary depending on the image information. When the image information corresponds to a document image, for example, reduction of cost is effectively performed by performing an operation of setting "standard" as the print quality, "plain paper" as the print sheet, and "grayscale" as the color setting. On the other hand, when the image information corresponds to an image of a photograph or the like, high-definition print is effectively realized by performing an operation of setting "high quality" as the print quality, "photo paper" as the print sheet, and "color" as the color setting. Furthermore, even in photographs, photographs of children may be subjected to the high-definition print using expensive sheets whereas quality of photographs of people other than children may be suppressed. Specifically, types of image information may be finely categorized, and an operation to be performed on a certain type of image information may depend on user's preference. The method disclosed in JP-A-2018-99817 does not take such a difference between different types of image information into consideration, and therefore, accurate estimation is difficult.

Therefore, in this embodiment, the relationship between the image information and the user operation associated with the image information is mechanically learnt. By this, the user operation recommended for the image information may be accurately estimated. When the estimated user operation is displayed, for example, reduction of a burden of the user may be realized.

Figure 12:
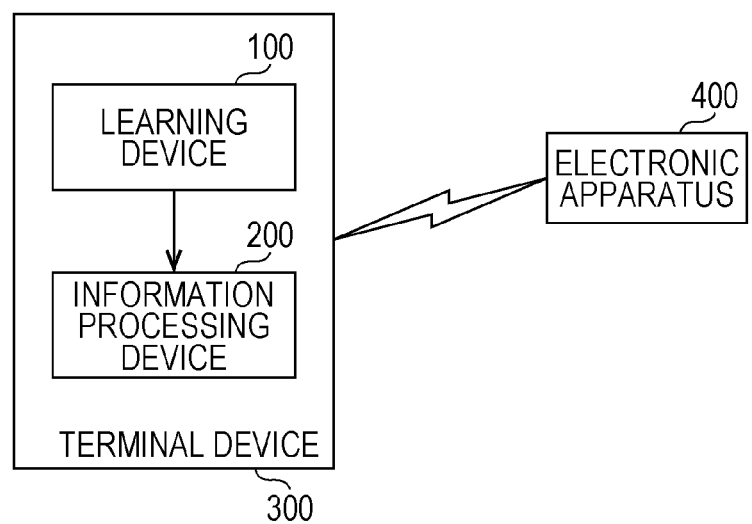
FIG. 12 is a diagram illustrating an example of an apparatus including a learning device and an information processing device.
Figure 13:
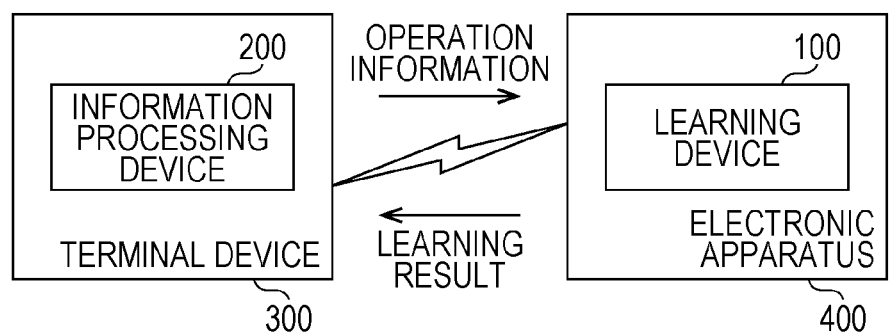
FIG. 13 is a diagram illustrating an example of an apparatus including a learning device and an information processing device.

FIGS. 12 and 13 are diagrams illustrating the relationships among a learning device 100, an information processing device 200, the terminal device 300, and the electronic apparatus 400. The learning device 100 performs a learning process, and the information processing device 200 performs an estimation process. In the learning process, machine learning is performed based on training data so as to obtain a result of the learning. The result of the learning is specifically a learnt model. In the estimation process, a result of estimation based on an input is output using a learnt model generated by the learning process.

As described with reference to FIGS. 4 to 10, a reception of a user operation by the terminal device 300 is estimated in FIGS. 12 and 13. The information processing device 200 determines a recommended operation when image information to be printed is determined. The determined operation is displayed for the user in an apparatus operated by the user as described hereinafter with reference to FIGS. 20 to 22, for example. It is preferable that the information processing device 200 is included in the terminal device 300 which receives the user operation in terms of a smooth display operation.

The learning device 100 may be included in the terminal device 300 as illustrated in FIG. 12 or the electronic apparatus 400 as illustrated in FIG. 13. When issuing an instruction for printing based on given image information to the electronic apparatus 400, the terminal device 300 may obtain a data set in which the image information and operation information indicating an operation actually performed by the user are associated with each other. In the example of FIG. 12, the learning device 100 performs learning using a data set obtained by the terminal device 300. In the example of FIG. 13, the learning device 100 obtains a data set from the terminal device 300 through communication using the communication section 420 before performing learning using the data set. The learning process determines weighting coefficient information based on a large number of data sets as described below, and therefore, a load of the learning process is larger than that of the estimation process. The learning process may be efficiently performed when capability of the electronic apparatus 400 is higher than that of the terminal device 300, for example, with the configuration illustrated in FIG. 13. Furthermore, the learning device 100 may be included in an apparatus which is different from the terminal device 300 and the electronic apparatus 400. For example, the learning device 100 may be included in a server system, not illustrated, connected to the terminal device 300.

As described with reference to FIG. 11, when the electronic apparatus 400 receives a user operation, the information processing device 200 is preferably included in the electronic apparatus 400. In this case, the learning device 100 may be included in the terminal device 300, electronic apparatus 400, or other apparatuses, such as a server system.

Furthermore, the information processing device 200 is included in the apparatus which receives a user operation associated with image information, for example, in the foregoing description. However, the information processing device 200 may be included in the other apparatuses, such as a server system. When the terminal device 300 receives a user operation, for example, the terminal device 300 transmits information required for the estimation process, such as image information selected to be printed, to the server system. The server system performs the estimation process based on the learnt model and returns a result of the estimation to the terminal device 300. The terminal device 300 performs a process of displaying the received result of the estimation for the user. As described above, the learning device 100 and the information processing device 200 may be realized in various modes.

2. Learning Process
2.1 Example of Configuration of Learning Device

Figure 14:
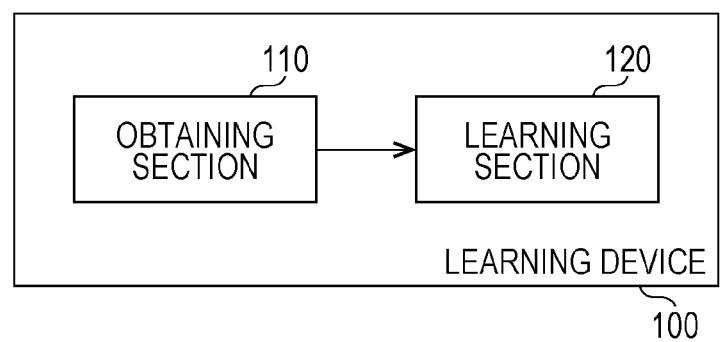
FIG. 14 is a diagram illustrating an example of a configuration of the learning device.

FIG. 14 is a diagram illustrating an example of a configuration of the learning device 100 according to this embodiment. The learning device 100 includes an obtaining section 110 which obtains training data to be used for learning and a learning section 120 which performs machine learning based on the training data.

The obtaining section 110 is a communication interface which obtains training data from other devices, for example. Alternatively, the obtaining section 110 may obtain training data stored in the learning device 100. The learning device 100 includes a storage section, not illustrated, for example, and the obtaining section 110 is an interface which reads training data from the storage section. The learning in this embodiment is supervised learning, for example. The training data in the supervised learning is a data set in which input data and correct label are associated with each other.

The learning section 120 performs machine learning based on the training data obtained by the obtaining section 110 so as to generate a learnt model. Note that the learning section 120 of this embodiment is configured by hardware described below. The hardware may include at least one of a circuit which processes a digital signal and a circuit which processes an analog signal. For example, the hardware may be configured by at least one circuit device implemented on a circuit substrate or at least one circuit element. Examples of at least one circuit device include an integrated circuit (IC), for example. Examples of at least one circuit element include a resistance or a capacitor, for example.

Furthermore, the learning section 120 may be realized by a processor described below. The learning device 100 of this embodiment includes a memory which stores information and a processor which operates based on information stored in the memory. The information includes programs and various data, for example. The processor includes hardware. Various processors, such as a CPU, a graphics processing unit (GPU), or a digital signal processor (DSP), may be used as the processor. Examples of the memory include a semiconductor memory, such as an SRAM or a DRAM, a register, a magnetic storage device, such as a hard disk device, and an optical storage device, such as an optical disc device. For example, the memory stores a computer-readable instruction, and when the processor executes the instruction, functions of the various sections included in the learning device 100 are realized as processes. The instruction may be an instruction set constituting a program or may specify an operation of a hardware circuit of the processor.

Specifically, the obtaining section 110 obtains image information and operation information indicating a user operation associated with the image information. The learning section 120 mechanically learns the relationship between the image information and the operation information based on a data set in which the image information and the operation information which are associated with each other. By this, a recommended user operation may be accurately estimated based on the image information which is a target of the user operation. For example, operations which are desired by the user to be executed may be appropriately displayed in a period from when the image information is selected to when an operation of executing printing of the image information is performed.

The learning device 100 illustrated in FIG. 14 may be included in the terminal device 300 as illustrated in FIG. 12, for example. In this case, the learning section 120 corresponds to the processor 310 of the terminal device 300. The obtaining section 110 corresponds to the communication section 320 of the terminal device 300 or another interface. Alternatively, the learning device 100 may be included in the electronic apparatus 400 as illustrated in FIG. 13. In this case, the learning section 120 corresponds to the processor 410 of the electronic apparatus 400. The obtaining section 110 corresponds to the communication section 420 of the electronic apparatus 400 or another interface.

2.2 Neural Network

Figure 15:
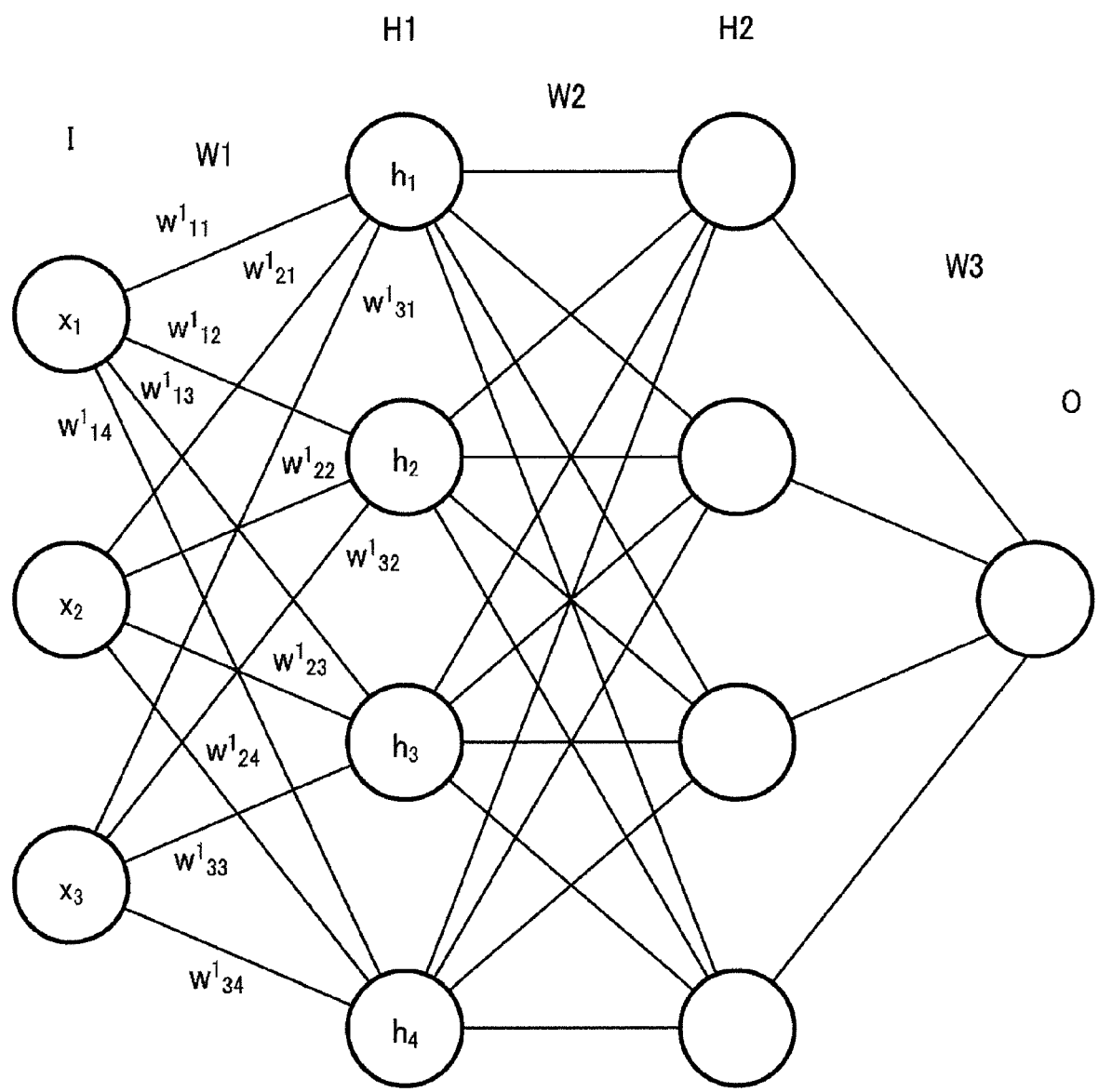
FIG. 15 is a diagram illustrating an example of a neural network.

Machine learning using a neural network will be described as a concrete example of the machine learning. FIG. 15 is a diagram illustrating an example of a basic configuration of a neural network. The neural network is a mathematical model for simulating a brain function on a computer. Each circle in FIG. 15 is referred to as a node or a neuron. In the example of FIG. 15, the neural network includes an input layer, two intermediate layers, and an output layer. The input layer is denoted by I, the intermediate layers are denoted by H1 and H2, and the output layer is denoted by O. Furthermore, in the example of FIG. 15, the number of neurons in the input layer is 3, the number of neurons in each of the intermediate layers is 4, and the number of neurons in the output layer is 1. However, the number of intermediate layers and the number of neurons included in each of the layers may be variously modified. Each of the neurons included in the input layer are coupled to the neurons included in the first intermediate layer H1. Each of the neurons included in the first intermediate layer is coupled to the neurons included in the second intermediate layer, and each of the neurons included in the second intermediate layer is coupled to the neuron included in the output layer. Note that the intermediate layers may be rephrased as a hidden layers.

The input layer includes the neurons which individually output input values. In the example of FIG. 15, the neural network receives $x_1$, $x_2$, and $x_3$ as inputs, and the neurons included in the input layer output $x_1$, $x_2$, and $x_3$, respectively. Note that some sort of preprocessing may be performed on the input values after each of the neurons included in the input layer outputs values obtained after the preprocessing.

In each of the neurons in the intermediate layers onwards, a calculation simulating a state in which information is transmitted as an electric signal in a brain is performed. In a brain, a degree of Easiness of transmission of information is changed depending on a coupling degree of synapses, and therefore, the coupling degree is represented by a weight W in the neural network. In FIG. 15, W1 indicates a weight between the input layer and the first intermediate layer. W1 indicates aggregate of weights of a given neuron included in the input layer and a given neuron included in the first intermediate layer. When a weight between a p-th neuron in the input layer and a q-th neuron in the first intermediate layer is denoted by "$w^1_{pq}$", the weight W1 of FIG. 15 is information including 12 weights $w^1_{11}$ to $w^1_{34}$. The weight W1 means information including a number of weights corresponding to a product of the number of neurons included in the input layer and the number of neurons included in the first intermediate layer in a broad way.

In the first intermediate layer, a calculation based on Expression (1) below is performed on a first neuron. In one neuron, outputs of neurons in a preceding layer coupled to the neuron are subjected to a product-sum operation and a bias is further added to a resultant value. The bias in Expression (1) is $b_1$.

$$h_1 = f\left(\sum_i w^1_{i1} \cdot x_i + b_1\right) \quad (1)$$

Furthermore, as illustrated in Expression (1), in the calculation in one neuron, an activating function f which is a non-linear function is used. An ReLU function indicated by Expression (2) below is used as the activating function f, for example. In the ReLU function, when a variable is 0 or less, 0 is obtained and when a variable is larger than 0, a value of the variable itself is obtained. However, various functions may be generally used as the activating function f, and a sigmoid function or a function obtained by modifying the ReLU function may be used. Although a calculation formula for $h_1$ is illustrated in Expression (1), the similar calculation is performed on the other neurons included in the first intermediate layer.

$$f(x) = \max(0, x) = \begin{cases} 0 & (x \le 0) \\ x & (x \ge 0) \end{cases} \quad (2)$$

The same is true to the layers onwards. Assuming that a weight between the first and second intermediate layers is denoted by "W2", in each of the neurons included in the second intermediate layer, a product-sum operation is performed using an output of the first intermediate layer and the weight W2, a bias is added, and a calculation of applying an activating function is performed. In the neuron included in the output layer, outputs of the preceding layer are added by weighting and a bias is added. In the example of FIG. 15, the preceding layer of the output layer is the second intermediate layer. In the neural network, a result of the calculation in the output layer corresponds to an output of the neural network.

As is apparent from the description above, an appropriate weight and an appropriate bias are required to be set to obtain a desired output from inputs. Note that the weight may be referred to as a weighting coefficient hereinafter. Furthermore, a bias may be included in the weighting coefficient. In the learning, a data set of a given input x and an appropriate output for the input which are associated with each other is prepared. The appropriate output is a correct label. The learning process in the neural network may be seen to be a process of obtaining a most probable weighting coefficient based on the data set. In the learning process in the neural network, various learning methods including backpropagation are generally used. Since the learning methods may be widely applied in this embodiment, detailed descriptions thereof are omitted.

Furthermore, a configuration of the neural network is not limited to that illustrated in FIG. 15. For example, in the learning process and the estimation process described below in this embodiment, a convolutional neural network (CNN) which is widely used, for example, may be used. The CNN includes a convolutional layer and a pooling layer. A convolutional calculation is performed in the convolutional layer. Here, the convolutional calculation is specifically a filter process. A process of reducing a horizontal and vertical size of data is performed in the pooling layer. In the CNN, when image information is input, for example, a process taking the relationship between a given pixel and pixels in the vicinity of the given pixel into consideration may be performed. In the CNN, characteristics of a filter used in the convolutional calculation are learnt in the learning process using the backpropagation. Specifically, the weighting coefficient in the neural network includes the filter characteristics in the CNN.

Note that the example in which a learnt model uses a neural network is described hereinabove. However, the machine learning in this embodiment is not limited to the method using a neural network. For example, various general machine learning methods, such as a support vector machine (SVM), or a further developed machine learning method may be applied as the method of this embodiment, for example.

2.3 Example of Training Data and Detailed Learning Process

Figure 16:
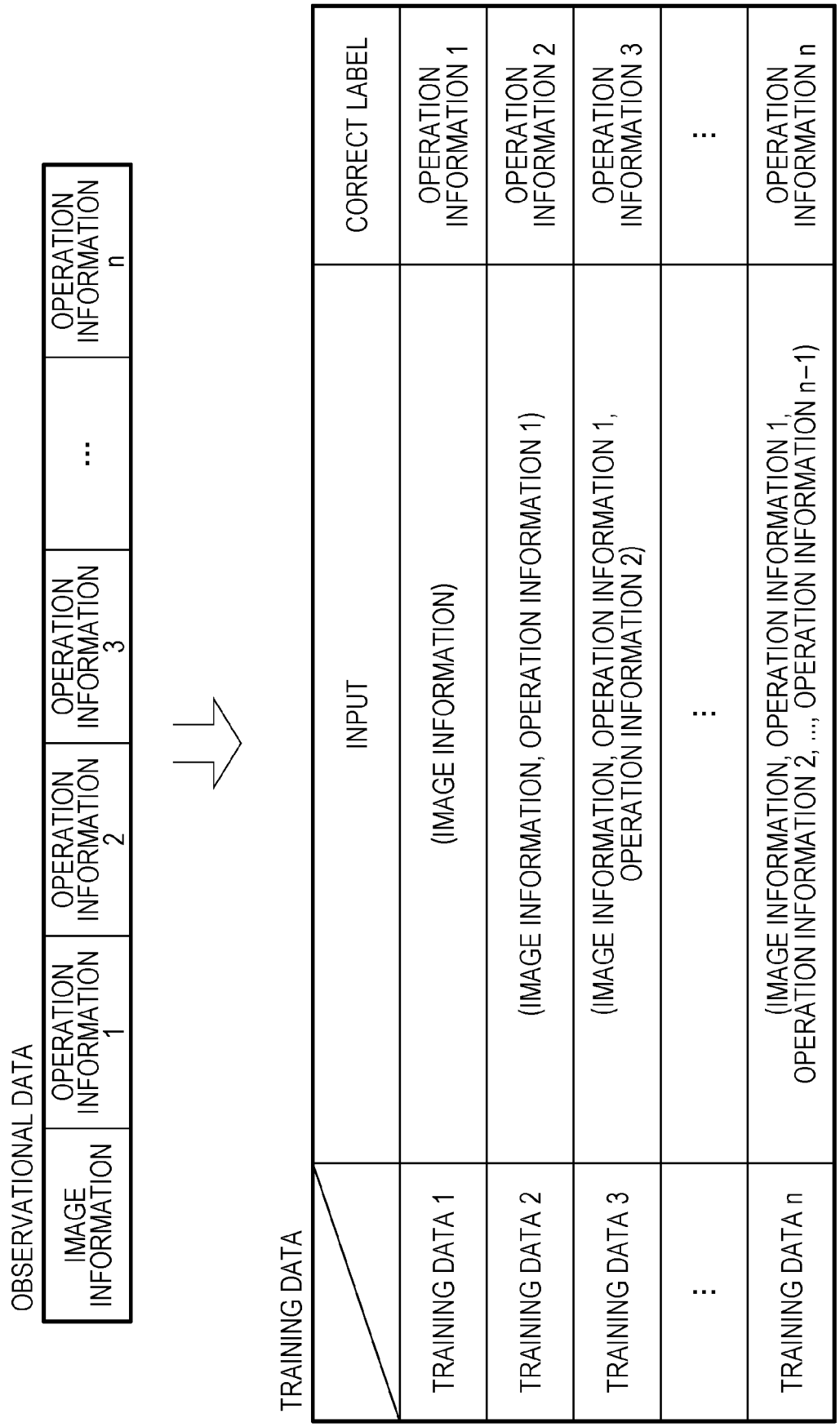
FIG. 16 is a diagram illustrating examples of observational data and training data.

FIG. 16 is a diagram illustrating observational data obtained in the apparatus which receives a user operation and training data used for the learning process in the learning device 100. For simplicity of description, an example in which the learning device 100 obtains observational data will be described. Note that, as described with reference to FIGS. 12 and 13, various modifications may be made as concrete configurations and the learning device 100 may obtain a result of some sort of preprocessing performed on the observational data obtained by another device.

As described with reference to FIGS. 4 to 10, the user first performs an image selection operation of selecting image information. Note that, in a document generation application or an image editing application, currently-operated data is selected to be printed when a print start operation is performed. The image selection operation of this embodiment includes such a print start operation.

Thereafter, the user performs various operations associated with the image information and finally performs an operation of completing the process associated with the image information. When the image information is print data to be printed, the process associated with the image information corresponds to a print process and the operation for completing the process corresponds to a print execution operation. Furthermore, the various operations associated with the image information include an operation of selecting a setting item and an operation of selecting a setting value.

As illustrated in FIG. 16, the apparatus which receives a user operation obtains the observational data in which the image information and operation information indicating a series of operations performed on the image information are associated with each other. The operation information corresponds to information specifying a user operation. The operation information is operation IDs assigned to respective operations executable on the image information. The operation ID is information which may uniquely specify a user operation, and different operation IDs are assigned to different operations.

An example in which the user performs a series of operations described below will be described. Note that the learning device 100 determines whether the operations are a series of operations based on a determination as to whether image information to be processed is the same, for example. Alternatively, the learning device 100 may determine operations performed in a period from the image selection operation to the print execution operation as a series of operations.
(1) An image selection operation
(2) An operation of selecting a sheet size as a setting item
(3) An operation of selecting "A5" as a setting value of the sheet size
(4) An operation of selecting a color setting as a setting item
(5) An operation of selecting "grayscale" as a setting value of the color setting
(6) A print execution operation In this case, observational data in which the image information selected in the operation (1) above and five operation IDs indicating the operations (2) to (6) are associated is obtained. Note that the method of this embodiment estimates a recommended operation to be performed associated with the image information after the image information is specified. Specifically, necessity of recommendation of the image selection operation for the user is low, and therefore, the operation ID indicating the operation (1) may be omitted in the learning process. Furthermore, operation order is taken into consideration in this embodiment, and therefore, it is assumed that the five operation IDs are arranged in time series in order from the operation (2) to the operation (6) described above. Referring to FIG. 16, operation information 1 corresponds to an operation ID indicating the operation (2) described above, and operation information 2 corresponds to an operation ID indicating the operation (3) described above. Similarly, operation information 3 to operation information n (n=5) correspond to operation IDs indicating the operations (4) to (6) described above, respectively.

The learning device 100 of this embodiment mechanically learns a condition for estimating one of next operations recommended for the user based on the image information and user operations which have been performed in time series on the image information.

For example, when a stage of the image selection operation (1) is focused, the learning device 100 performs a learning process such that a setting item selection operation (2) of selecting a sheet size is recommended. Furthermore, when a stage of the operation (2) is focused, the learning device 100 performs a learning process such that a setting value selection operation (3) of selecting "A5" is recommended. The same process is performed thereafter.

A concrete example of training data used for the learning process is illustrated in FIG. 16. Training data 1 to training data n (n is an integer equal or larger than 2, for example) are used in the learning process. Each of the training data has image information and i operation information (i is an integer equal to or larger than 0 and equal to or smaller than n−1) as inputs and operation information i+1 as a correct label.

Figure 17:
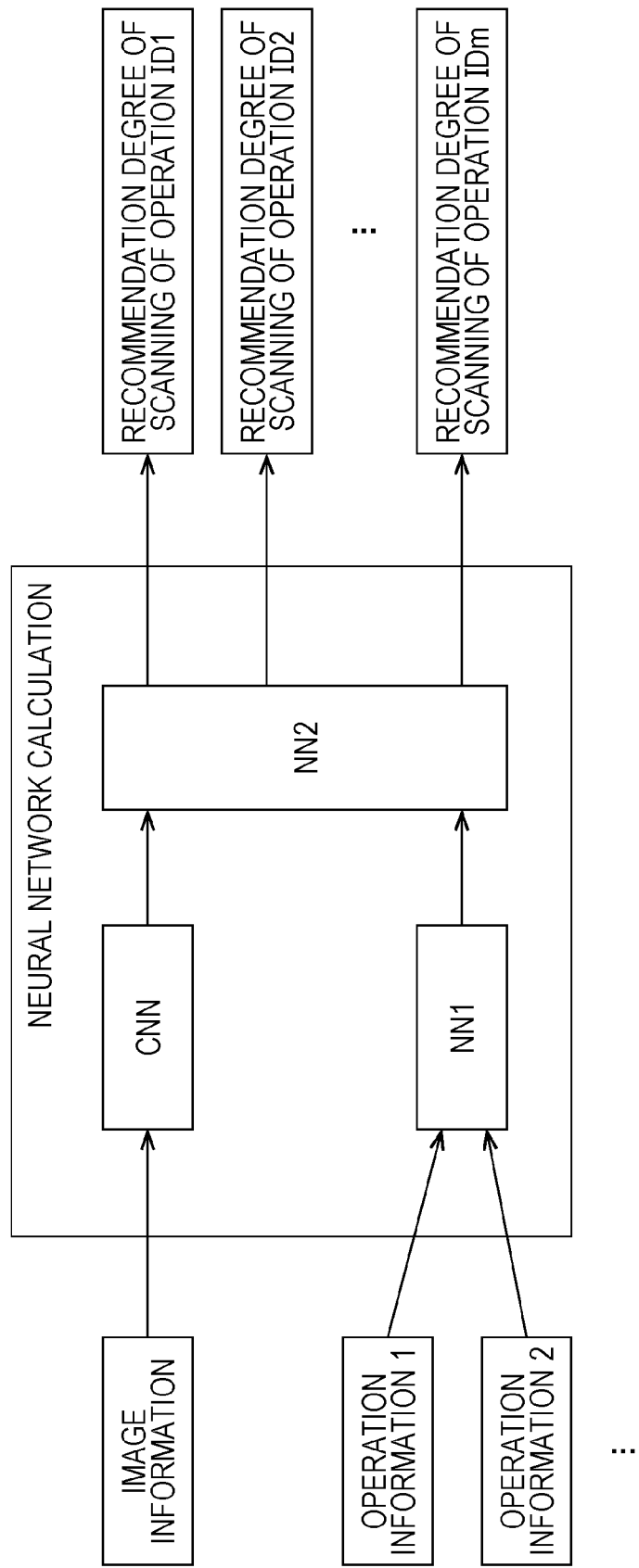
FIG. 17 is a diagram illustrating an example of the neural network according to this embodiment in detail.

FIG. 17 is a diagram illustrating an example of a model of a neural network according to this embodiment. The neural network includes a CNN which receives image information as an input and outputs first intermediate data, an NN1 which receives operation information as an input and outputs second intermediate data, and an NN2 which receives the first intermediate data and the second intermediate data as inputs and outputs output data. Note that the NN1 may be a neural network of a fixed-length input which receives p operation information (p is an integer equal to or larger than 2) as inputs. For example, when q operation information (q is an integer equal to or larger than 0 and smaller than p) are input, inputs of the NN1 correspond to the q operation information and (p−q) NULL data. Alternatively, NN1 may be a neural network of a variable-length input. For example, the NN1 may be a recurrent neural network (RNN) which may use variable-length time-series data as an input or a neural network obtained by developing the RNN. The RNN is generally used, and therefore, a detailed description thereof is omitted.

The NN2 outputs data based on the intermediate data output from the CNN and the NN1. The NN2 is a neural network including a fully-connected layer and a softmax layer, for example. The fully-connected layer indicates a mode in which each of nodes in a given layer is coupled to all nodes in a next layer. In the softmax layer, a calculation is performed using a general softmax function. The output data is output from the softmax layer, for example, and probability data corresponding to all estimated operations are output. It is assumed that m operations are to be performed as user operations associated with image information and an operation ID1 to an operation IDm are assigned to the respective operations. In this case, the output data is m probability data which are summed up to 1. The m probability data indicate probabilities of recommendation of the operations corresponding to the operation ID1 to the operation IDm.

For example, a learning process based on the training data 1 of FIG. 16 is performed in accordance with the following flow. First, the learning section 120 inputs data to a neural network and obtains output data by performing forward calculation using a weight obtained when the data is input. When the training data 1 is used, the input data corresponds to image information. The output data obtained by the forward calculation is the m probability data corresponding to the operation ID1 to the operation IDm as described above.

The learning section 120 calculates an error function based on the obtained output data and a correct label. For example, when the training data 1 of FIG. 16 is used, a correct label is the operation information 1. Specifically, the correct label is information for obtaining probability data of 1 for recommendation of the operation ID corresponding to the operation information 1 and probability data of 0 for recommendation of the other m−1 probability data. The learning section 120 calculates difference degrees between the m probability data obtained by the forward calculation and the m probability data corresponding to the correct labels as an error function and updates weighting coefficient information in a direction in which the difference becomes small. Note that various forms of the error function are generally used and are also widely applicable to this embodiment. Furthermore, although the weighting coefficient information is updated using backpropagation, for example, other methods may be used.

The learning process based on single training data has been briefly described above. In the learning process, as for the other training data, appropriate weighting coefficient information is learnt by repeatedly performing the same process. Note that, in the learning process, accuracy is generally improved by increasing the number of training data. Although single observational data is illustrated in FIG. 16, it is preferable that a large number of training data are provided by obtaining a large number of observational data. For example, the learning section 120 determines a portion of obtained data as training data and a remaining portion as test data. The test data may be rephrased as evaluation data or validation data. Then the learning section 120 applies the test data to a learnt model generated by the training data and performs learning until an accuracy rate becomes equal to or larger than a predetermined threshold value.

As described above, the learning section 120 generates a learnt model by the machine learning. The learnt model is used to determine a recommended operation associated with the image information. The information on a weighting coefficient is set in the learnt model having an input layer, an intermediate layer, and an output layer, based on a data set in which the image information and the operation information are associated with each other. The information on a weighting coefficient includes a first weighting coefficient between the input layer and the intermediate layer and a second weighting coefficient between the intermediate layer and the output layer. The information on a weighting coefficient may include a weighting coefficient between a given intermediate layer and a succeeding intermediate layer. Each of the weighting coefficients includes a filter characteristic used in a convolution operation as described above. The learnt model causes the computer to input data on the received image information in the input layer, perform a calculation based on the set information on a weighting coefficient, and output recommended operation information indicating a recommended operation associated with the image information from the output layer. The learnt model is stored in a storage section 230 of the information processing device 200 as described below. Furthermore, the method of this embodiment may be applied to the learnt model.

Figure 18:
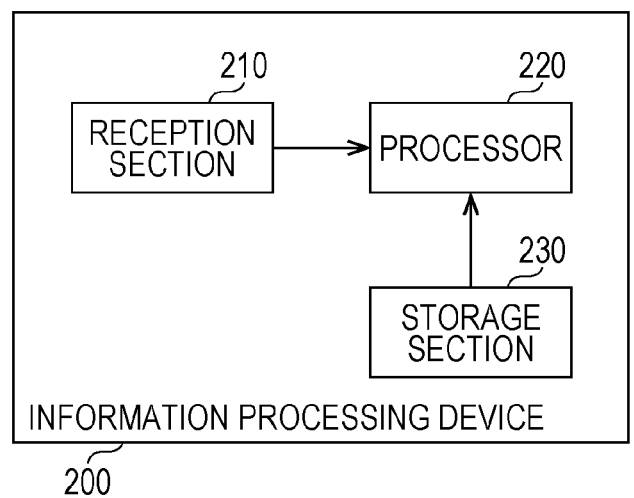
FIG. 18 is a diagram illustrating an example of a configuration of the information processing device.

3. Estimation Process 3.1 Example of Configuration of Information Processing Device FIG. 18 is a diagram illustrating an example of a configuration of an estimation device according to this embodiment. The estimation device is the information processing device 200. The information processing device 200 includes a reception section 210, a processor 220, and a storage section 230.

The storage section 230 stores a learnt model obtained by mechanically learning the relationship between the image information and the operation information based on a data set in which the image information and the operation information indicating a user operation are associated with each other. The reception section 210 receives image information as an input. The processor 220 determines recommended operation information indicating a recommended operation associated with the image information received as an input based on the learnt model.

By this, the operation to be recommended for the user may be estimated in association with the image information. As described above, when the operation associated with the image information is performed, the recommended operation may depend on content of the image information. By obtaining recommended operation information using the image information, an appropriate operation may be recommended for the user.

Note that the learnt model is used as a program module which is a portion of artificial intelligence software. The processor 220 outputs data indicating a recommended operation associated with the image information which is an input in accordance with an instruction issued by the learnt model stored in the storage section 230.

As with the learning section 120 of the learning device 100, the processor 220 of the information processing device 200 is configured by hardware which includes at least one of a circuit which processes a digital signal and a circuit which processes an analog signal. Furthermore, the processor 220 may be realized by a processor below. The information processing device 200 of this embodiment includes a memory which stores information and a processor which operates based on information stored in the memory. Various processor may be used, such as a CPU, a GPU, or a DSP, as the processor. The memory may be a semiconductor memory, a register, a magnetic storage device, or an optical storage device.

Note that the calculation performed by the processor 220 based on the learnt model, that is, the calculation for outputting data based on input data may be executed by software or hardware. That is, the product-sum calculation in Expression (1) and the like above or the filter calculation in the CNN may be executed by software. Alternatively, the calculations may be executed by a circuit device, such as a field-programmable gate array (FPGA). Furthermore, the calculations may be executed by a combination of software and hardware. Accordingly, the operation of the processor 220 in accordance with an instruction issued by the learnt model stored in the storage section 230 may be realized in various modes.

The information processing device 200 illustrated in FIG. 18 may be included in the terminal device 300 as illustrated in FIG. 12, for example. In this case, the processor 220 corresponds to the processor 310 of the terminal device 300. The reception section 210 corresponds to the communication section 320 of the terminal device 300 or another interface. The storage section 230 corresponds to the storage section 360 of the terminal device 300. Alternatively, the information processing device 200 may be included in the electronic apparatus 400 as illustrated in FIG. 13. In this case, the processor 220 corresponds to the processor 410 of the electronic apparatus 400. The reception section 210 corresponds to the communication section 420 of the electronic apparatus 400 or another interface. The storage section 230 corresponds to the storage section 460 of the electronic apparatus 400.

In the foregoing description, the learning device 100 and the information processing device 200 are separately described. However, the method of this embodiment is not limited to this. For example, the information processing device 200 may include the obtaining section 110 which obtains image information and operation information and the learning section 120 which mechanically learns the relationship between the image information and the operation information based on a data set in which the image information and the operation information are associated with each other. In other words, the information processing device 200 includes the components included in the learning device 100 illustrated in FIG. 14 in addition to the components illustrated in FIG. 18. By this, the learning process and the estimation process may be efficiently executed in the same device.

3.2 Flow of Estimation Process

Figure 19:
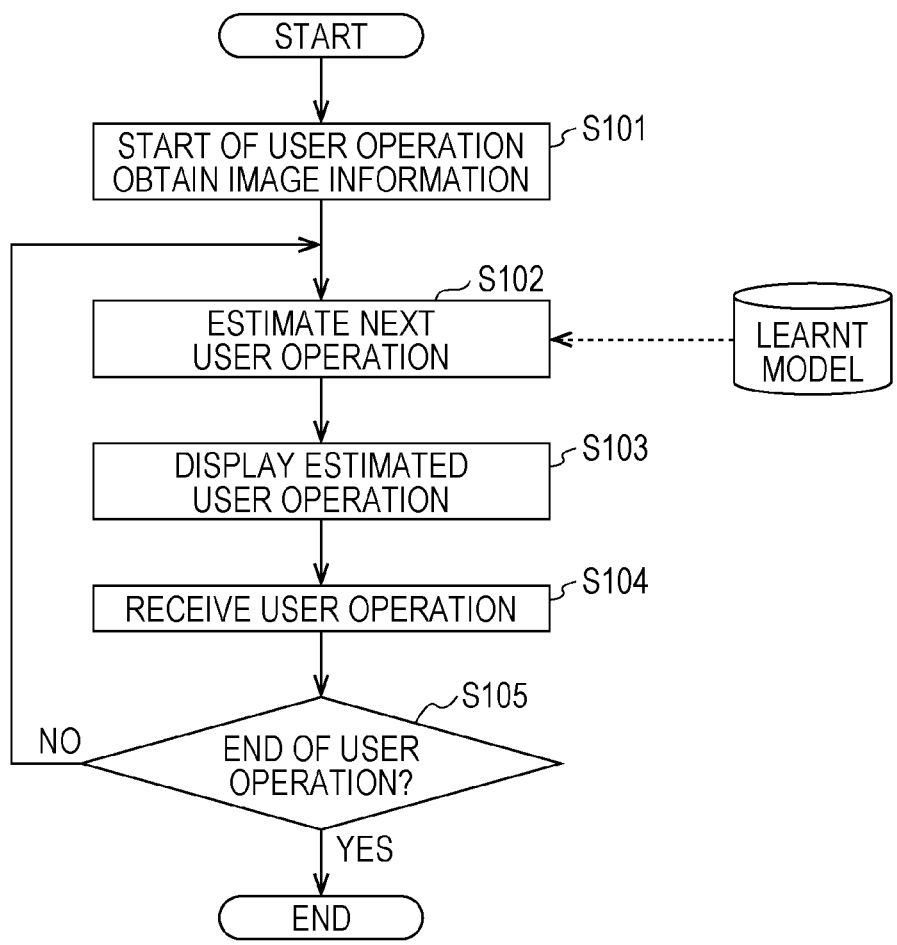
FIG. 19 is a flowchart of a process performed by the information processing device.

FIG. 19 is a flowchart of a process performed by the information processing device 200. When this process is started, first, the reception section 210 starts reception of a user operation and receives image information selected by the image selection operation (S101).

When the image information is obtained, the processor 220 obtains recommended operation information indicating an operation recommended as a next user operation based on the image information and a learnt model stored in the storage section 230 (S102). When the process in step S102 is performed for the first time, the image information is an input of the learnt model. The processor 220 determines an operation ID having a highest probability of recommendation as the recommended operation information based on m probability data which are outputs from the softmax layer, for example. The processor 220 performs a process of displaying the estimated recommended operation information for the user (S103). The process in step S103 is executed to perform guide display for facilitating a user operation, for example. An example of the guide display process will be described in detail hereinafter with reference to FIGS. 20 and 22.

Thereafter, the reception section 210 receives a next user operation (S104), and the processor 220 determines whether the user operation has been terminated (S105). When the user operation received in step S104 is a print execution operation, for example, the processor 220 determines that the user operation has been terminated (Yes in S105). When the determination is affirmative in step S105, the processor 220 terminates the process.

Furthermore, when the user operation received in step S104 is an operation other than the print execution operation, the processor 220 determines that the user operation has not been terminated (No in S105). In this case, the processor 220 returns to step S102 and estimates an operation to be recommended as a next operation of the user operation received in step S104. In this case, the image information and the operation information indicating the user operation received in step S104 serve as inputs to the learnt model. Furthermore, when a loop from step S102 to step S105 is executed a plurality of times, the image information and a plurality of operation information indicating a plurality of user operations received in step S104 serve as inputs to the learnt model. Note that, when a plurality of operation information is obtained, the processor 220 may use all the operation information as inputs of the learnt model or a portion of the operation information as inputs of the learnt model. When the learnt process is performed based on the training data illustrated in FIG. 16, for example, all the operation information is preferably set as inputs of the learnt model also in the estimation process.

The same is true to a process performed thereafter, and the information processing device 200 repeatedly performs a reception of a user operation and a determination of next recommended operation information until it is determined that the user operation has been terminated. As described above, the reception section 210 receives first operation information associated with the image information, and the processor 220 determines second operation information indicating an operation recommended as an operation to be performed after a first operation corresponding to the first operation information as recommended operation information based on the image information, the first operation information, and the learnt model.

By this, when some sort of user operation associated with the image information is performed, recommended operation information may be determined taking not only the image information but also the user operation into consideration. Therefore, high estimation accuracy of the recommended operation information may be attained when compared with an example in which only the image information is used. Note that, as described above, an input of the learnt model is not limited to latest single operation information and may include a plurality of operation information indicating operations performed on the image information to be processed.

The user operations represented by the operation information include a first selection operation of selecting a setting item associated with a setting of the electronic apparatus 400 and a second selection operation of selecting a setting value of the setting item. By this, an operation of selecting a setting item or a setting value may be used as at least one of operation information as an input of the estimation process and recommended operation information as an output of the estimation process. When an operation of selecting a setting item or a setting value is performed, for example, a user operation to be recommended as an operation to be performed after the selection operation may be estimated. Alternatively, execution of the operation of selecting a setting item or a setting value may be recommended based on some sort of input including the image information. As described hereinabove with reference to FIGS. 4 to 10, when the process associated with the image information is performed, the operation of selecting a setting item and a setting value is required in some cases. Moreover, a plurality of setting values may be normally selectable for one setting item, and furthermore, a plurality of setting items are provided in many cases. Specifically, a burden of the user is large when the operation of selecting a setting item and a setting value is performed. According to the method of this embodiment, since the operation of selecting a setting item and a setting value is mechanically learnt, a burden of the user may be efficiently reduced.

Furthermore, the reception section 210 may receive the first selection operation of selecting a setting item as operation information, and the processor 220 may determine the second selection operation of selecting a recommended setting value of the setting item as recommended operation information based on the image information, operation information indicating the first selection operation, and the learnt model.

As described above, when the operation of selecting a setting item is performed, the operation of selecting a setting value is seen to be consecutively performed. When the first selection operation is input, an operation which is seen to be desired by the user may be appropriately recommended by determining the second selection operation as recommended operation information. Furthermore, in the general method, since a plurality of candidates of a setting value are expected, the user is required to view the plurality of candidates, determine an appropriate one of the setting values, and perform the operation of selecting the setting value. However, since the second selection operation is determined as the recommended operation information, a burden of the user is reduced when a setting value is selected.

The setting item corresponds to a print layout setting and setting values include information for determining whether one-side printing or both-side printing is to be performed and information for determining the number of images to be printed on a sheet of a print medium. In this way, a burden of the user may be reduced when settings associated with printing, such as one-side printing, both-side printing, and layout printing, are performed.

Furthermore, the setting item corresponds to a print sheet setting, and setting values include information for determining a sheet size and information for determining a sheet type. The print sheet setting corresponds to a sheet type indicated by C1 of FIG. 4 and a sheet size indicated by C5 of FIG. 4. The setting value of the sheet type is "plain paper" illustrated in FIG. 5, for example, and the setting value of the sheet size is "A4" illustrated in FIG. 9, for example. By this, a burden of the user may be reduced when the settings associated with a print sheet are performed.

Furthermore, the setting item corresponds to a color/monochrome setting, and setting values include information for determining whether color printing or monochrome printing is to be performed. This setting corresponds to C3 of FIG. 4 and FIG. 7. Note that, although grayscale printing using multi-gradation data is illustrated as the monochrome printing in the foregoing description, black-and-white printing using binary image data may be performed. By this, a burden of the user may be reduced when the settings associated with color are performed.

As illustrated in step S103 of FIG. 19, the processor 220 performs the process of displaying a guide for the user based on the determined recommended operation information. By this, the recommended operation may be displayed so that the user easily recognizes the recommended operation.

Figure 20:
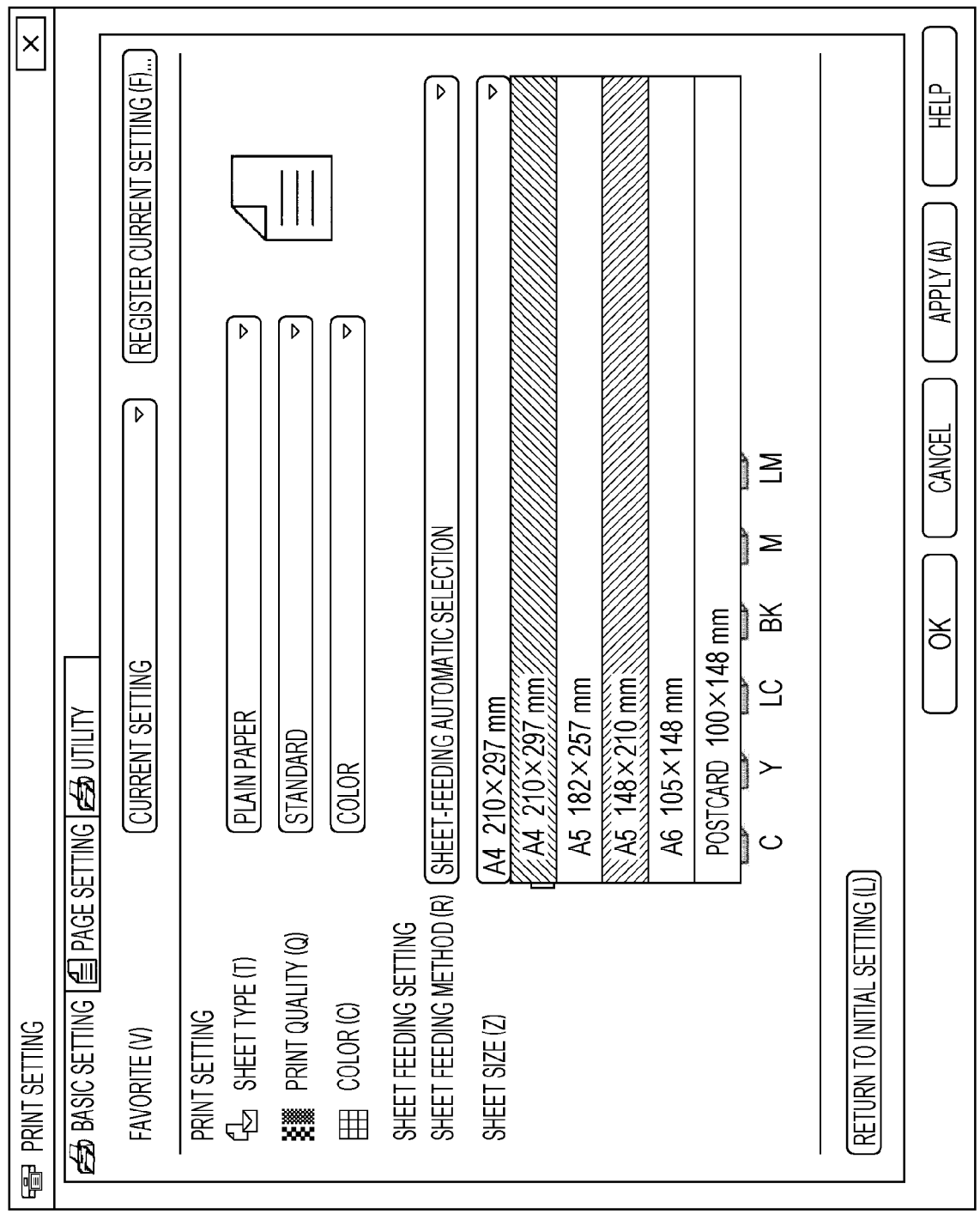
FIG. 20 is a diagram illustrating an example of a screen displaying recommended operation information.
Figure 21:
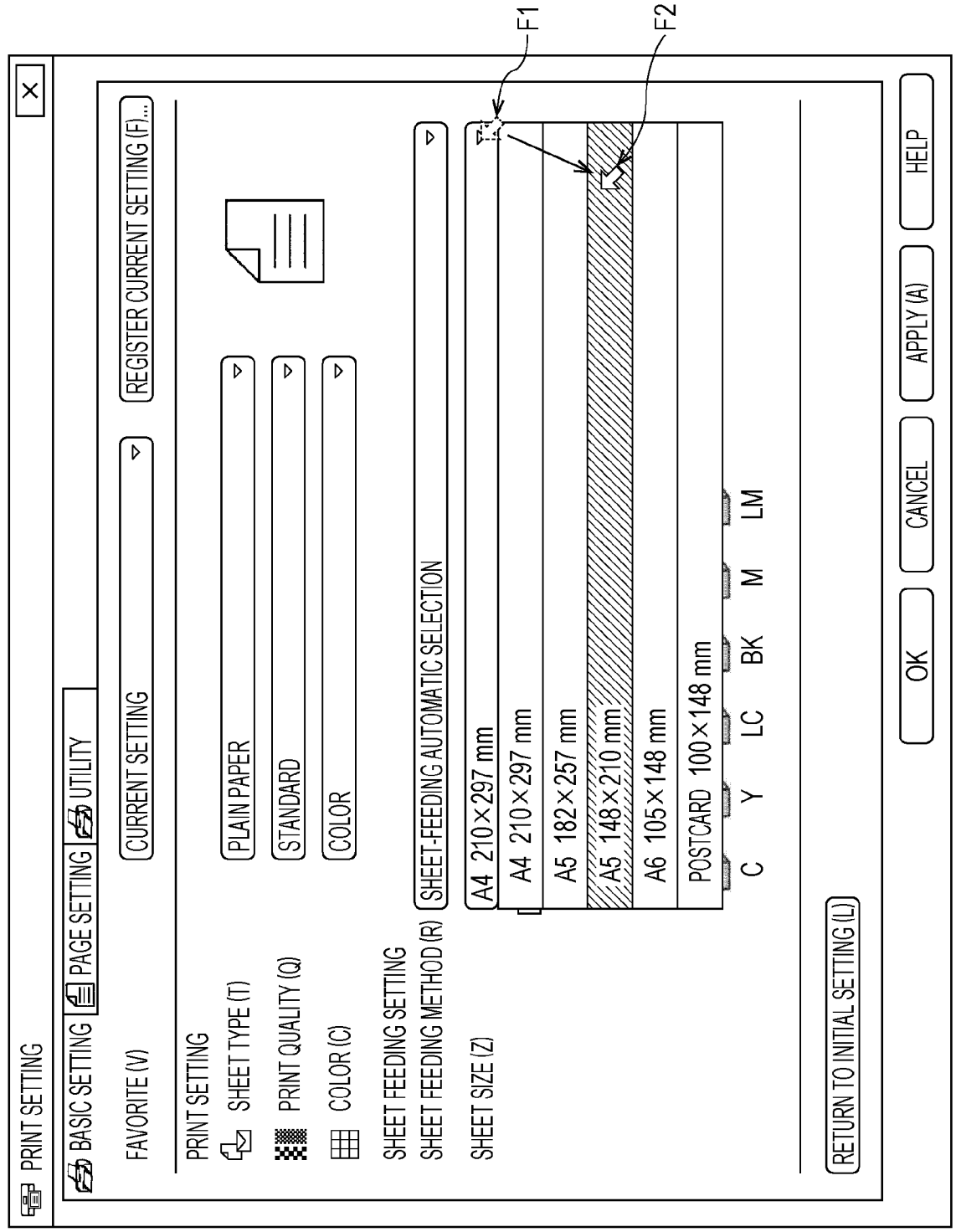
FIG. 21 is a diagram illustrating an example of a screen displaying recommended operation information.
Figure 22:
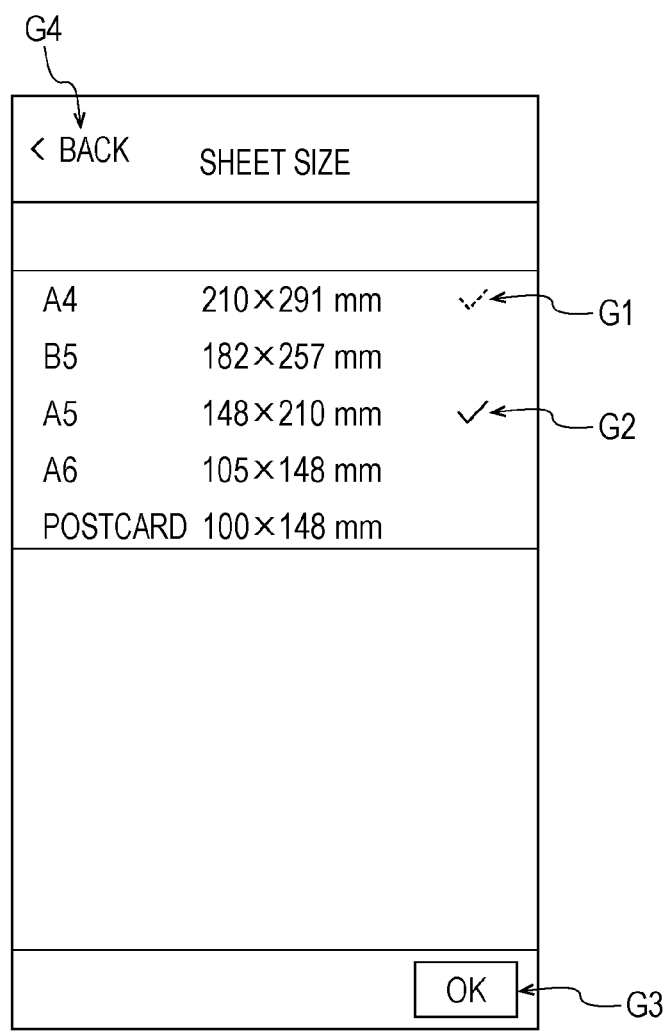
FIG. 22 is a diagram illustrating an example of a screen displaying recommended operation information.

FIGS. 20 to 22 are diagrams illustrating examples of a display screen for displaying a guide. An example in which an operation of selecting a setting value "A5" is determined as information on a next recommended operation when the setting item selection operation is performed to select a sheet size will be described hereinafter. Note that it is assumed that a current setting value of a sheet size is "A4" similarly to the example of FIG. 4.

As illustrated in FIG. 20, the processor 220 performs a process of emphasizing a region in a screen corresponding to the recommended operation information. In the emphasis process, a background color of the region corresponding to "A5" is changed, for example. However, the emphasis process is not limited to this, and a text color may be changed, at least one of a text size and a region size may be enlarged, or animation display may be performed by blinking text or a region. Note that a background color of "A4" is changed since "A4" is a currently-selected setting value, and therefore, the change does not directly relate to the guide display in this embodiment. Since the visibility of the setting value corresponding to the recommended operation information is higher than that of the other setting values, the user may easily recognize the displayed recommended operation information.

Furthermore, as illustrated in FIG. 21, the processor 220 may perform a process of automatically moving a position of a pointer to the region in the screen corresponding to the recommended operation information. The pointer is a mouse cursor, for example. In FIG. 21, F1 indicates a position of the pointer when the setting item selection operation is performed to select a sheet size, and F2 indicates a position of the pointer after the movement. The movement of the pointer from F1 to F2 may be instantaneously performed or may be performed for approximately one to several seconds so that the movement of the pointer is clearly displayed for the user. Since an example in which the setting value on which the pointer overlaps is displayed in the emphasized manner in this embodiment, the background color of the region corresponding to "A5" is changed. The user is not required to move the pointer when an operation corresponding to the recommended operation information is performed, and therefore, a burden of the user may be reduced.

Furthermore, FIG. 22 is an example of a guide display in the display section 330 of the terminal device 300 which is a mobile terminal device, such as a smartphone, or the display section 430 of the electronic apparatus 400. As described with reference to FIG. 10, when the setting item selection operation is performed to select D41, the sheet size selection screen indicated by D5 is entered. In the sheet size selection screen, a selected setting value is clearly displayed. For example, a check mark is displayed on a right side of the selected setting value. For example, the processor 220 performs a process of changing a setting value of a sheet size from "A4" to "A5" and performs a display process of deleting a check mark indicated by G1 and a display process of adding a check mark indicated by G2. The deletion of the mark indicated by G1 and the addition of the mark indicated by G2 may be instantaneously performed. Alternatively, the processor 220 may perform a display process of gradually reducing color density of the mark indicated by G1 and increasing color density of the mark indicated by G2 so that the change of the setting value is clearly displayed for the user. When the recommended operation information is inappropriate, the setting value may be changed to a value which is not desired by the user. Therefore, as illustrated in FIG. 22, the setting value may be changed when the user performs an explicit operation, such as a press of an OK button indicated by G3. For example, in a state of FIG. 22, when a return button indicated by G4 is pressed without pressing the OK button, the setting value of the sheet size "A4" which has been set before the change is maintained.

The example in which the guide display is performed to display the setting value selection operation when the setting item selection operation is performed has been described with reference to FIGS. 20 to 22. However, the recommended operation information in this embodiment is not limited to the setting value selection operation. For example, the processor 220 may perform the guide display process to display the setting item selection operation. The processor 220 performs guide display such that a region corresponding to one of the setting items is emphasized in the screen illustrated in FIG. 4, for example. The guide display may be performed when the display in FIG. 4 or the like is displayed after the image selection operation is performed, for example, or when the screen illustrated in FIG. 4 is displayed again when the setting value selection operation is performed on one of the other setting items, for example. Furthermore, the processor 220 may determine operation information indicating the print execution operation as the recommended operation information. In this case, the processor 220 may prompt the user to execute printing by performing the guide display such that the OK button indicated by C6 in FIG. 4 and the print button indicated by D33 in FIG. 10 are emphasized. Furthermore, the operations associated with the image information may include operations different from the image selection operation, the setting item selection operation, the setting value selection operation, and the print execution operation, and the processor 220 may perform guide display associated with the other operations.

4. Modifications 4.1 Modification Associated with Training Data

As described above with reference to FIG. 16, the example in which the learning process and the estimation process are performed using the information on operations performed in time series on given image information has been described. Note that the concrete process is not limited to this. The series of operations described above is described again hereinafter in detail.

(1) Image selection operation
(2) An operation of selecting a sheet size as a setting item
(3) An operation of selecting "A5" as a setting value of a sheet size.
(4) An operation of selecting a color setting as a setting item
(5) An operation of selecting "grayscale" as a setting value of a color setting
(6) A print execution operation In this case, it is important to perform the two operations, that is, the operation of changing a sheet size to "A5" and the operation of changing a color setting to "grayscale", on the image information selected in the operation (1). Therefore, the operation of changing a color setting may be performed before the operation of changing a sheet size.

Accordingly, the learning section 120 may generate training data by extracting a portion of information on the series of operations included in observational data or by changing order of the operation information. In the foregoing example, the operation information 1 to the operation information n (n=5) are arranged in actually-executed order, that is, order of (2), (3), (4), (5), and (6). The learning section 120 may change this order to order of (4), (5), (2), (3), and (6) before the process of generating training data and the learning process are performed. The order may be variously changed as long as a condition in which the relationship between the operation of selecting a setting item and the operation of selecting a setting value of the setting item is maintained is satisfied in a broad sense.

Furthermore, the process of estimating single recommended operation information which is recommended as a next operation based on given operation information is described above. However, the estimated recommended operation information is not limited to one and the processor 220 may output two or more recommended operation information. For example, the processor 220 determines information on a next recommended operation based on the image information. Thereafter, the processor 220 performs the estimation process based on a learnt model using the image information and the determined recommended operation information as inputs so as to determine information on a further next recommended operation. The same is true to the following processing and the processor 220 may output a plurality of recommended operation information using the estimated recommended operation information as a new input. Alternatively, the processor 220 may change a configuration of the neural network and output a plurality of recommended operation information by one forward calculation.

4.2 Additional Learning

In the description above, the learning process and the estimation process are individually described. For example, training data is stored in advance in a learning step and the learning process is performed based on the stored training data. In the learning step, the process of determining recommended operation information is not performed. When a sufficient amount of training data is stored, the learning device 100 performs the learning process described above so as to generate a learnt model. In the estimation step, the information processing device 200 performs the estimation process by continuously using the generated learnt model. In this case, the learnt model generated once is fixed and update thereof is not estimated.

Figure 23:
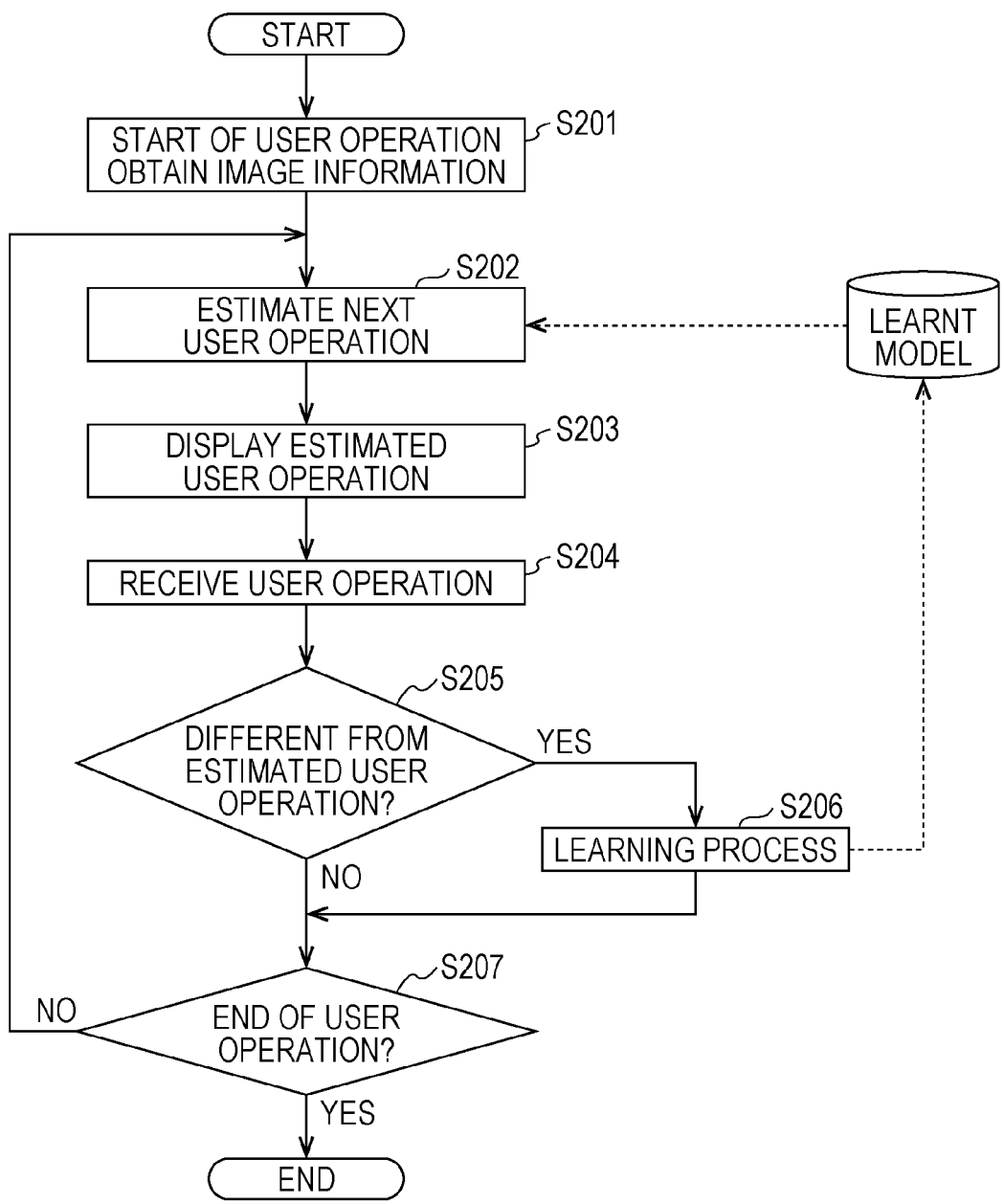
FIG. 23 is a flowchart of a process performed by the information processing device.

However, the method in this embodiment is not limited to this and a result of the estimation process may be fed back to the learning process. FIG. 23 is a flowchart of a process according to this modification. Step S201 to step S204 of FIG. 23 are the same as step S101 to step S104 of FIG. 19. After a process in step S204, the processor 220 performs a process of comparing recommended operation information determined in step S202 with a user operation received in step S204 (S205).

When the recommended operation information does not match the user operation (Yes in S205), estimation based on the learnt model is seen to be wrong and the learnt model is seen to be inappropriate. Therefore, the learning section 120 of the learning device 100 updates the learnt model by performing an additional learning process (S206). It is assumed that the processor 220 determines recommended operation information based on the image information and r operation information (r is an integer equal to or larger than 0) in step S202. In this case, the learning section 120 additionally performs learning based on training data having a correct label corresponding to operation information indicating the user operation received in step S204 using the image information and the r operation information as inputs. In this way, the learnt model may be updated so that an operation actually performed by the user is easily selected as the recommended operation information.

When the recommended operation information matches the user operation (No in S205), the obtained learnt model is seen to be appropriate, and therefore, the learning process is skipped. When the determination is negative in step S205 or when the process in step S206 is terminated, it is determined whether the user operation has been terminated (S207). The process in step S207 is the same as that in step S105 of FIG. 19. However, the additional learning may be performed when the recommended operation information matches the user operation.

When the additional learning is performed, the learnt model may be updated with reference to preference of the user by the additional learning. Therefore, high estimation accuracy of the recommended operation information may be attained. Furthermore, the learnt model may be updated in the estimation step, and therefore, extremely high learning accuracy is not required for initial learning. The initial learning is a learning process of generating an initial learnt model before the update is performed by the additional learning. Accordingly, a processing load in the initial learning may be reduced.

4.3 User ID

The example in which the image information and the operation information are used as inputs of the learning process and the estimation process has been described hereinabove. However, the inputs are not limited to these, and other information may be added. For example, when the electronic apparatus 400 is shared with family members, preference of printing may be different depending on a member. For example, a father prints photographs in high image quality and documents by monochrome printing in low image quality. Furthermore, a mother prints documents in high image quality, and a son prints photographs and documents in low image quality. Such a difference of preference occurs.

The learnt model may be mechanically learnt based on a data set in which image information, operation information, and a user ID are associated with one another. The user ID is identification information for uniquely specifying a user. In the estimation process, the user ID is input in addition to the image information and the operation information. Alternatively, the learning section 120 may generate learnt models for individual users, and the processor 220 may perform a process of changing a learnt model to be used depending on a user ID.

In this way, recommended operation information may be changed depending on a user even though the image information is the same. Specifically, the estimation process may be performed with high accuracy by reflecting the preference of a user.

Furthermore, an operation associated with image information may vary depending on a timing when the print process is executed by the electronic apparatus 400. For example, the following difference may be seen. That is, monochrome printing is mostly performed on weekdays since image information for work is mostly printed on weekdays whereas color printing is mostly performed on weekends since image information for private is mostly printed on weekends. Therefore, the learnt model may be mechanically learnt based on a data set in which image information, operation information, and time information are associated with one another. The time information may be information on a date in a month-day-year format, information on a date in a month-date format, a date in a day of the week, information on a time, or a combination of them. In this way, the recommended operation information may be changed depending on the time information in addition to the image information. Specifically, the estimation process may be performed with high accuracy by reflecting lifestyle of a user.

4.4 Scanner

As described above, the electronic apparatus 400 may be a multifunction peripheral having a scanning function. In this case, the image information includes information indicating whether the image information is scanned image information obtained by scanning. When an image corresponding to the image information read by the scanner is to be printed, the image information may be determined as an irregular size since the image is read larger than an actual document size in the printing. In this case, the user is required to specify a correct regular size using the screen illustrated in FIG. 9 or the like before each printing.

In this modification, information indicating whether the image information is scanned image information is included in the data set. Therefore, when the image information corresponds to a scanned image, a regular size to be specified for the image information is seen to be learnt. Therefore, the processor 220 of the information processing device 200 may guide the user to select an appropriate regular size when scanned data of an unknown size is obtained as image information.

Furthermore, when the image information is scanned image information, the learnt model may be mechanically learnt based on a data set in which the image information, operation information, and a destination of storage of the image information corresponding to the scanned image are associated with one another. The destination of storage may be the storage section 460 of the electronic apparatus 400, the storage section 360 of the terminal device 300, or a storage section in a server system. Furthermore, when an external storage medium, such as a universal serial bus (USB) memory or an SD card, may be coupled to the apparatus, the external storage medium may be selected as the destination of storage. Furthermore, when a plurality of SD cards are coupled to the apparatus, the individual SD cards may be discriminated from one to another using individual information. The different storage destinations have different storage capacities, different communication speeds, and different portability properties. Therefore, it is highly likely that the different storage destinations have different tendencies in print settings. For example, the following difference occurs. That is, when a user who separately uses an SD card for work and an SD card for private performs printing, monochrome printing is mostly performed for the SD card for work since image information in the SD card for work mostly corresponds to documents and color printing is mostly performed for the SD card for private since image information in the SD card for private mostly corresponds to photographs. Therefore, by using the storage destination of the image information in the learning process and the estimation process, estimation accuracy of the recommended operation information may be improved.

The user operation performed when a scanned image is to be printed is described above. However, the method of this embodiment is not limited to this. For example, when the electronic apparatus 400 which performs pre-scanning is used, the processor 220 of the information processing device 200 may estimate a user operation to be performed when main scanning is performed based on image information obtained by the pre-scanning. The pre-scanning is a process of reading an image to obtain outline of a document which is performed before the main scanning is performed.

Examples of setting items of scanning may include a storage destination, resolution, and a color setting. Examples of setting values of the storage destination include "main body of electronic apparatus" and "SD card" as described above. Examples of setting values of the resolution include "150 dpi (dots per inch)" and "300 dpi". Examples of a color setting value include "color", "grayscale", and "black and white". Here, "black and white" indicates a binary image. Furthermore, other setting items may be used in the scanner.

As described above, even in the scanning process, when the user performs desired scanning, an operation of selecting a setting item to be changed, an operation of selecting an appropriate value from among a plurality of setting values in the setting item, and the like are required to be performed on each of the setting items. Furthermore, this operation is required to be performed for each document set, and accordingly, a burden of the user is large. The document set is one or more documents to be subjected to the series of scanning processes.

The learning device 100 performs the machine learning based on a data set in which image information which is a scanned image and operation information associated with the image information are associated with each other. The information processing device 200 proposes an operation recommended for reading a document using the image information which is a scanned image obtained when pre-scanning is performed on the document and the learnt model. By this, a burden of the user may be reduced in the scanning process using the electronic apparatus 400. Note that the example in which the various operations are performed before the main scanning is performed is described, and therefore, the image information is a scanned image obtained as a result of the pre-scanning. Note that recommended operation information may be displayed using the image information obtained as a result of the main scanning for an operation which is executable after the scanning process, such as an operation of determining a setting value of a storage destination.

As described above, the information processing device according to this embodiment includes the storage section, the reception section, and the processor. The storage section stores a learnt model obtained by mechanically learning the relationship between image information and operation information based on a data set in which the image information and the operation information indicating a user operation are associated with each other. The reception section receives the image information as an input. The processor determines recommended operation information indicating a recommended operation to be performed on the image information received as an input based on the learnt model.

According to the method of this embodiment, a recommended operation to be performed on the image information received as an input is determined using the learnt model generated by the machine learning based on the data set in which the image information and the operation information are associated with each other. Since the image information is used in the learning process and the estimation process, a recommended operation may be accurately estimated for the user.

Furthermore, the reception section may receive first operation information associated with the image information, and the processor may determine second operation information indicating an operation recommended as an operation to be performed after a first operation corresponding to the first operation information as recommended operation information based on the image information, the first operation information, and the learnt model.

By this, a recommended operation may be successively estimated as a next operation based on the image information and the operation information.

Furthermore, examples of the user operation represented by the operation information may include a first selection operation of selecting a setting item associated with a setting of the electronic apparatus and a second selection operation of selecting a setting value of the setting item.

Accordingly, a burden of the user may be reduced when a setting item is selected and when a setting value of the setting item is selected.

Furthermore, the reception section may receive a first selection operation of selecting a setting item as operation information, and the processor may determine a second selection operation of selecting a recommended setting value of a setting item as recommended operation information based on the image information, operation information indicating the first selection operation, and the learnt model.

Accordingly, a burden of the user may be reduced when a setting value of a setting item is selected.

The setting item may be a print layout setting and setting values may include information for determining whether one-side printing or a both-side printing is to be performed and information for determining the number of images to be printed on a sheet of a print medium.

Accordingly, a burden of the user may be reduced when an operation of setting print layout is performed.

Furthermore, the setting item may be a print sheet setting, and setting values may include information for determining a sheet size and information for determining a sheet type.

Accordingly, a burden of the user may be reduced when an operation of setting a print sheet is performed.

Furthermore, the setting item may be a color/monochrome setting, and setting values may include information for determining whether color printing or monochrome printing is to be performed.

Accordingly, a burden of the user may be reduced when an operation of setting color printing or monochrome printing is performed.

Furthermore, the image information may include information indicating whether the image information is scanned image information obtained by scanning.

In this way, appropriate recommended operation information may be determined depending on a result of a determination as to whether an image to be processed is a scanned image.

Furthermore, the image information may be information on a scanned image. The learnt model may be mechanically learnt based on a data set in which the image information, operation information, and a destination of storage of the image information which is the scanned image information are associated with one another.

In this way, appropriate recommended operation information may be determined depending on a destination of a storage of the scanned image.

The learnt model may be mechanically learnt based on a data set in which the image information, the operation information, and a user ID are associated with one another.

Accordingly, appropriate recommended operation information may be determined taking preference of the user into consideration.

Furthermore, the processor may perform a process of displaying a guide for the user based on the determined recommended operation information.

Accordingly, the user may be prompted to execute an operation associated with the recommended operation information.

Furthermore, the information processing device may include an obtaining section which obtains image information and operation information and a learning section which mechanically learns the relationship between the image information and the operation information based on a data set in which the image information and the operation information are associated with each other.

Accordingly, the learning process and the estimation process may be efficiently executed in the same device.

The learnt model may include an input layer, an intermediate layer, and an output layer, and in the learnt model, weighting coefficient information including a first weighting coefficient between the input layer and the intermediate layer and a second weighting coefficient between the intermediate layer and the output layer may be set based on a data set in which the image information and the operation information are associated with each other. The learnt model causes the computer to function such that image information received as an input is input to the input layer, a calculation based on set weighting coefficient information is performed, and recommended operation information is output from the output layer.

In this way, since the weighting coefficient information is learnt in the learning process, a learnt model which enables appropriate estimation of recommended operation information may be generated. Specifically, a learnt model using a neural network may be generated.

Furthermore, the learning device according to this embodiment includes an obtaining section which obtains image information and operation information indicating a user operation associated with the image information and a learning section which mechanically learns the relationship between the image information and the operation information based on a data set in which the image information and the operation information are associated with each other.

According to the method of this embodiment, machine learning is performed based on a data set in which image information and operation information are associated with each other. Since recommended operation information may be determined using image information by performing the machine learning, an operation to be recommended for the user may be accurately estimated.

The learnt model according to this embodiment is used to determine a recommended operation associated with image information. The learnt model includes an input layer, an intermediate layer, and an output layer, and in the learnt model, weighting coefficient information including a first weighting coefficient between the input layer and the intermediate layer and a second weighting coefficient between the intermediate layer and the output layer are set based on a data set in which the image information and the operation information indicating a user operation associated with the image information are associated with each other. The learnt model causes the computer to input data on the image information received as an input in the input layer, perform a calculation based on the set weighting coefficient information, and output recommended operation information indicating a recommended operation associated with the image information from the output layer.

Although the embodiment has been described in detail above, those who skilled in the art may easily understand that various modifications may be made without noumenally departing from novelty and effects of this embodiment. Therefore, such modifications are all included in the scope of the present disclosure. For example, terms which are described at least once along with different terms which have wide meanings or which have the same meanings may be replaced by the corresponding different terms in any portion in the specification and the drawings. Furthermore, all combinations of the embodiment and the modifications are included in the scope of the present disclosure. Furthermore, configurations and operations of the learning device, the information processing device, and the system including the learning device and the information processing device are also not limited to those described in this embodiment, and various modifications may be made.

What is claimed is:

1. An information processing device comprising:
   a storage section configured to store a learnt model obtained by mechanically learning a relationship between image information and operation information representing a series of user operations performed on the image information, and the learnt model is trained on a data set in which the image information and the operation information are associated with each other;
   a reception section configured to receive the image information as an input; and
   a processor configured to determine recommended operation information indicating a recommended operation for the image information that was received as an input, and the recommended operation information is based on an output of the learnt model, wherein:
   the reception section is further configured to receive first operation information associated with a first operation for the image information, and
   the processor is further configured to determine the recommended operation information indicating the recommended operation based on the image information, the first operation information, and the learnt model, and recommend performing the recommended operation next to performing the first operation, where the image information and the first operation information are both being input to the learnt model, and the recommended operation information is being output from the learnt model.

2. The information processing device according to claim 1, wherein
   the user operation indicated by the operation information includes a first selection operation of selecting a setting item associated with settings of an electronic apparatus and a second selection operation of selecting a setting value of the setting item.

3. The information processing device according to claim 2, wherein
   the reception section receives the first selection operation of selecting the setting item as the operation information, and
   the processor determines the second selection operation of selecting recommended setting value of the setting item as the recommended operation information based on the image information, the operation information indicating the first selection operation, and the learnt model.

4. The information processing device according to claim 2, wherein
   the setting item is a print layout setting, and
   the setting value includes information for determining whether one-side printing or both-side printing is performed and information for determining a number of images to be printed on a single print medium.

5. The information processing device according to claim 2, wherein
   the setting item is a print sheet setting, and
   the setting value includes information for determining a sheet size and information for determining a sheet type.

6. The information processing device according to claim 2, wherein
   the setting item is a color/monochrome setting, and
   the setting value includes information for determining whether color printing or monochrome printing is to be performed.

7. The information processing device according to claim 1, wherein
   the image information includes information indicating whether the image information is scanned image information obtained by scanning.

8. The information processing device according to claim 7, wherein
   the image information is the scanned image information, and
   the learnt model is mechanically learnt based on a data set in which the image information, the operation information, and a storage destination of the image information corresponding to the scanned image information are associated with one another.

9. The information processing device according to claim 1, wherein
the learnt model is mechanically learnt based on a data set in which the image information, the operation information, and a user ID are associated with one another.

10. The information processing device according to claim 1, wherein
the processor performs a process of displaying a guide for a user based on the determined recommended operation information.

11. The information processing device according to claim 1, further comprising:
an obtaining section configured to obtain the image information and the operation information; and
a learning section configured to mechanically learn the relationship between the image information and the operation information based on the data set in which the image information and the operation information are associated with each other.

12. The information processing device according to claim 1, wherein
the learnt model includes an input layer, an intermediate layer, and an output layer,
in the learnt model, weighting coefficient information including a first weighting coefficient between the input layer and the intermediate layer and a second weighting coefficient between the intermediate layer and the output layer is set based on the data set in which the image information and the operation information are associated with each other, and
the learnt model causes the processor to function such that the image information received as an input is input to the input layer, a calculation is performed based on the set weighting coefficient information, and the recommended operation information is output from the output layer.

13. A learning device comprising:
an obtaining section configured to obtain image information, first operation information representing a first user operation, and second operation information representing a second user operation, wherein both the first user operation and the second user operation are performed on the image information and are associated with the image information, and the second user operation is performed next to the first user operation; and
a learning section configured to mechanically learn a relationship between the image information, the first operation information, and the second operation information, and is trained to recommend performing the second operation in response to receiving the image information and the first operation information.

14. A non-transitory computer-readable storage medium storing a learnt model for determining a recommended user operation associated with image information, wherein
the learnt model includes an input layer, an intermediate layer, and an output layer,
in the learnt model, weighting coefficient information including a first weighting coefficient between the input layer and the intermediate layer and a second weighting coefficient between the intermediate layer and the output layer is set based on a data set in which the image information, first operation information representing a first user operation, and second operation information representing a second user operation, wherein both the first user operation and second user operation are performed on and associated with the image information, and the second user operation is performed next to the first user operation, and
the learnt model causes a computer to:
receive both the image information and the first operation information indicating the first operation as input to the input layer, and
calculate based on the set weighting coefficient information to output recommended operation information associated with the image information from the output layer, the recommended operation information indicating the recommended user operation that is to be performed next to the first operation.

* * * * *